United States Patent [19]

Shimoda et al.

[11] Patent Number: 5,274,396
[45] Date of Patent: Dec. 28, 1993

[54] BAR CODE PRINTING APPARATUS

[75] Inventors: Tomoyuki Shimoda; Shigehisa Shimizu, both of Kanagawa; Nobuyasu Akiyoshi, Tokyo, all of Japan

[73] Assignee: Fuji Photo Film Co., Ltd., Kanagawa, Japan

[21] Appl. No.: 423,357

[22] Filed: Oct. 17, 1989

[30] Foreign Application Priority Data

Oct. 17, 1988 [JP] Japan .................. 63-261114
Oct. 17, 1988 [JP] Japan .................. 63-261115
Dec. 26, 1988 [JP] Japan .................. 63-328372

[51] Int. Cl.$^5$ .................. G01D 9/42; G01D 5/34; G01N 21/86
[52] U.S. Cl. .................. 346/107 R; 250/231.14; 250/548
[58] Field of Search .................. 346/107 R, 136, 108; 328/133; 307/514, 269; 400/551, 568; 341/6, 11, 13, 14; 250/231.16, 231.14, 548; 315/207, 306

[56] References Cited

U.S. PATENT DOCUMENTS

| | | | |
|---|---|---|---|
| 3,517,322 | 6/1970 | Lay | 328/133 |
| 4,321,531 | 3/1982 | Marshall | 250/231 X |
| 4,422,176 | 12/1983 | Summers | 328/133 X |
| 4,544,259 | 10/1985 | Kanaoka et al. | 355/1 |
| 4,548,492 | 10/1985 | Kanaoka et al. | 355/50 |
| 4,587,496 | 5/1986 | Wolaver | 328/133 X |
| 4,892,426 | 1/1990 | Steele | 250/548 |

FOREIGN PATENT DOCUMENTS 3735646 4/1988 Fed. Rep. of Germany .

OTHER PUBLICATIONS 59-96966 Jun. 1984 Patent Abstract of Japan.
63-106634 May 1988 Patent Abstract of Japan.

*Primary Examiner*—Benjamin H. Fuller
*Assistant Examiner*—David Yockey
*Attorney, Agent, or Firm*—Young & Thompson

[57] ABSTRACT

A bar code printing apparatus includes a rotary. encoder for outputting encoder pulses in two different phases. The direction in which film is transported is discriminated by the encoder pulses and indicated by a forward direction pulse or a reverse direction pulse indicated for a predetermined length of transported film. A direction discriminating circuit comprises a clock pulse generator for generating clock pulses at a frequency higher than that at which the encoder pulse is output, a delay circuit for slightly delaying the clock pulse, a first latch circuit for latching one of the encoder pulses in synchronism with the clock pulse to output a transportation signal; a second latch circuit for outputting a latch condition signal; and two AND gates, each connected to the first and second latch circuits and the delay circuit, for outputting a forward direction pulse and a reverse direction pulse, respectively.

6 Claims, 24 Drawing Sheets

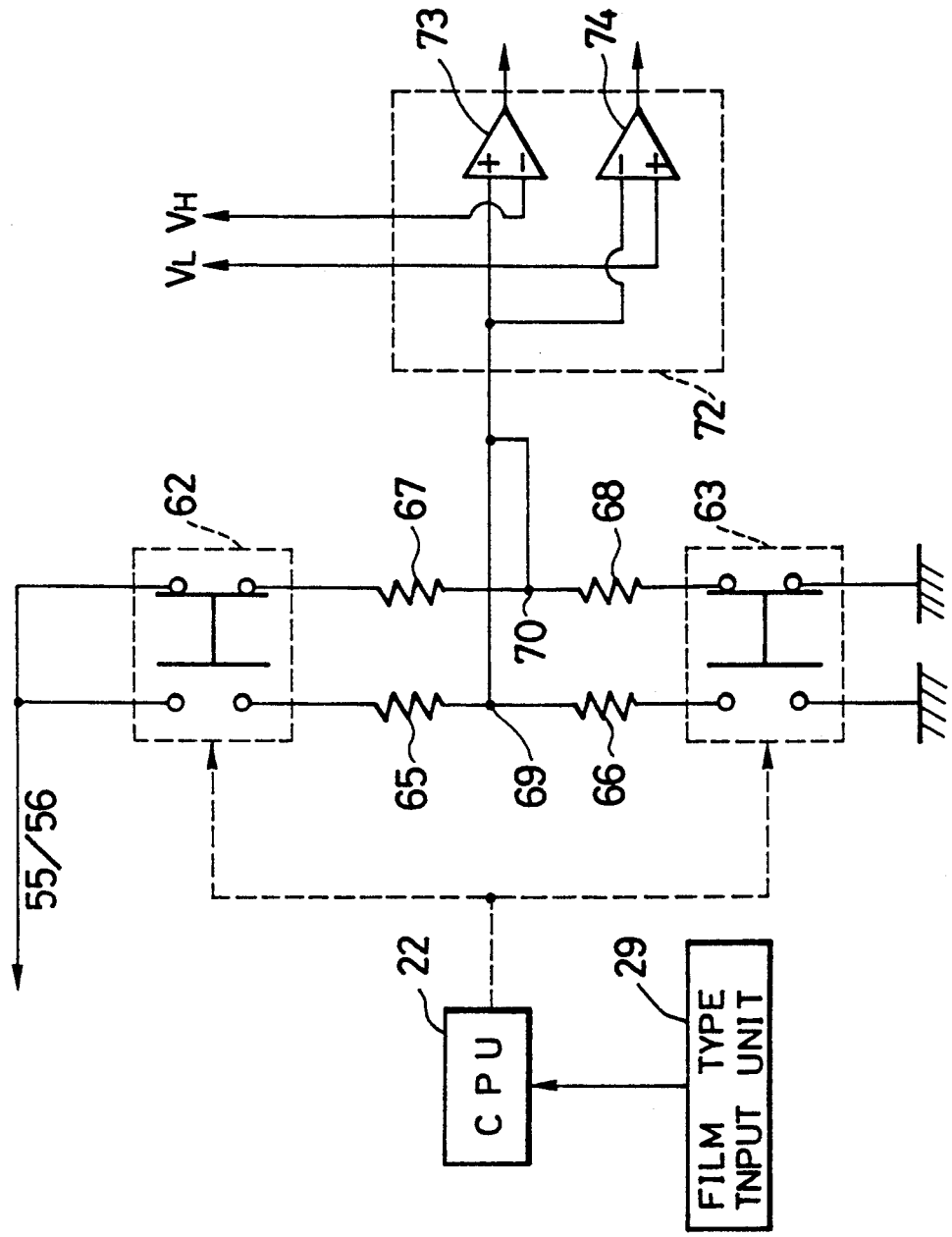

BAR CODE PRINTING APPARATUS

BACKGROUND OF THE INVENTION

The present invention relates to a bar code printer by which a photosensitive product is provided with latent images of bar codes during the manufacture of the photosensitive product.

In the manufacture of photosensitive products such as photographic films or the like (which are hereinafter referred to simply as film), it is typical to provide a film with latent images of bar codes indicating necessary information, such as frame numbers, as well as the frame numbers which are later photographically developed during the processing of the exposed film. The bar codes are automatically read by an optical reader or other bar code readers to provide information pertaining to the film. In particular, when printing extra prints from the film, the bar code is automatically read to position in the printing position that frame of the film whose extra print is desired. The bar code is also printed on a print made from the film, and used to identify the frame number of the film from which the print was made. If the bar code reader makes an error in reading the bar code of a customer's film, the printer will necessarily make a print other than that requested by the customer. Accordingly, strict quality control should be maintained in printing bar codes on films.

To indicate frame numbers by bar codes printed on a film, a DX bar code system has heretofore been used to indicate a manufacturer or the like, and a bar code indicating a frame number appears after a DX code on the film. However, because a wide space must be provided between the frame number bar code and the DX code, it often happens that the frame number bar code is disposed between adjacent frames, and are thus interrupted when the film is cut into several strips. And because the frames as actually exposed are not always accurately located adjacent frame number bar codes, the wider the space occupied by each frame number bar code, the greater the chances of cutting the film in a manner to interrupt the frame number bar codes.

In the DX bar code system, the film is formed with notches in one margin thereof, one for each exposed frame. During processing, the notch is used to provide a timing signal in order to locate each frame in a proper exposure position of a printer for making extra prints from the film. If the notch is formed in the film at a location where a frame number bar code is printed, it is hard to read the frame number bar code. Therefore, it is difficult to form notches in a film on which frame number bar codes are previously printed and automatically read during processing, without disrupting the bar codes.

In view of the above, a superior printing system would be one in which it was unnecessary to form notches in a film having frame number bar codes. However, film without notches cannot provide timing signals for reading the frame number bar codes; accordingly, in such a system the frame number bar codes themselves should be positively read. This requires printing frame number bar codes of a higher quality than is possible with conventional DX bar codes on the film.

To print the frame number bar codes with a high quality, not only should the printing head form an optical bar code pattern which is sharp and uniform in density, but also the film to be printed should be accurately positioned during printing the bar codes, to avoid double exposures. In an attempt at avoiding a double exposed bar code (which is often formed due to the reverse movement of film caused by the fluttering of a moving film, oscillations of a film upon the film stops or a play of gears having backrush included in a film transporting system), there has been proposed a side printing apparatus in cooperation with a control system comprising a rotary encoder for providing encoder pulse signals in two different phases in synchronism with the transportation of film, a direction discriminator for discriminating the direction in which a film is transported to provide a forward direction signal or a reverse direction signal, an up-down counter for starting to count up the reverse direction signals and count down the forward direction signals, and means for restraining a light emitting printing head until the up-down counter counts down to zero. Such a side printing apparatus is known from Japanese Unexam. Patent Publ. No. 59-96966 (1984).

Another type of side printing apparatus, known from, for example, Japanese Unexam. Patent Publ. No. 63-106633 (1988), comprises an up-down counter for counting up forward direction pulse signals from a direction discriminator and counting down reverse direction pulse signals from the same. A carry signal of the up-down counter is used as a print timing signal. In such a side printing apparatus, the up-down counter counts down reverse direction pulse signals after the reverse of direction of transportation of a film, so that the amount of movement in the reverse direction can be effectively corrected.

Because forward direction pulse signals and reverse direction pulse signals are counted up and down in the above-noted side printing apparatus, it is essential that the forward and reverse direction signals do not overlap one another. However, in the case of generating the forward and reverse direction pulse signals from the encoder pulse signals of different phase, if the film violently oscillates in its moving direction, a reverse direction pulse signal or a forward direction pulse signal is often generated immediately after a forward direction pulse signal or a reverse direction pulse signal, respectively, depending upon the amplitude and cycle of oscillation of the film. Because, in such a case, a reverse direction pulse signal or a forward direction pulse signal rises before the respective forward direction pulse signal or reverse direction pulse signal has fallen, the up-down counter makes an error and does not count either one of the forward or the reverse direction pulse signal. That is, because of the direction discriminator consisting of an integral logic circuit for determining whether an encoder pulse signal is at a high level (H) or a low level (L) with an associated threshold level, if the film oscillates at the transition of an encoder pulse signal between the high level (H) and the low level (L), then the rotary encoder repeatedly turns in both directions, so as to provide incomplete encoder pulse signals. Accordingly, the conventional direction discriminators have difficulty in positively following the changes of film movement direction so as to make the measurement of film transportation with a high degree of accuracy. This results in a difficulty in completely preventing a double exposure, whereby it would be possible to print a sharp bar code pattern on a film, which is automatically readable by means of a bar code reader.

If the rotary encoder, which is rotated by the film to detect the length of movement of the film, encounters operational failures or errors causing the interruption of encoder pulse signals, it is impossible to continue the measurement of film transportation. That is, if signals from the rotary encoder are interrupted due to breakdowns of the rotary encoder itself or elements of the signal transfer line, poor contacts of connectors, a mechanical failure in attaching the rotary encoder including loosened coupling, or a mechanical stress accumulated in the rotary encoder, then it is judged that the film has stopped and accordingly, printing is interrupted. The bar code print pattern is thus destroyed. As a result, a single bar of a bar code will be separated into two thin bars if the film stops such that a region where a bar code is to be printed is disposed in a printing position, or a wide space will be formed between two bars of a bar code if the film stops such that a region where a bar code is not to be printed is disposed in a printing position. In either case, such a bar code is incorrectly read by an automatic bar code reader.

Bar codes are generally printed with monocolor light. To provide the printing light, although it is possible to use the same color of light-emitting elements, it is preferred to use different colors of light and mix the different colors of light to provide monocolor light, with regard to the efficiency of coloration. For this reason, a plurality of light-emitting diodes or laser diodes having different wavelengths have heretobefore been used. Such light-emitting elements are driven by means of a drive circuit such as described in, for example, Japanese Unexam. Pat. Publ. No. 63-46409 (1988).

The drive circuit described in this publication is adapted to drive four LEDs having three different wavelengths, using six transistors to control an exposure. This drive circuit, although capable of providing a desired color of light, is complex in its structure for mixing different colors of light to form a monocolor of light. It is also difficult, controlling an exposure by controlling the times for which the LEDs emit light, to print bar codes on films having different film speeds. For example, because commercially available films have film speeds between 10 and 3200 ISO standard, and the fastest and slowest films thus differ in sensitivity by a factor of 320, if it is necessary to expose the fastest film for one $(1)\mu$ second, then the slowest film should be exposed for approximately $320\mu$ seconds. $320\mu$ seconds necessary to print on a moving film is too long to be neglected. If it is difficult to print on a moving film for a short exposure time, there is caused a blur of print pattern. Such a blur of print pattern if significant, results in narrow printed bars or narrow spaces between printed bars.

To solve the above problem, it has been proposed to change a drive voltage for the light-emitting elements. However, if a suitable voltage is not selected, an edge effect is caused in the printed bar code due to overexposure, or a dull color of bar code is formed due to underexposure. In either case, it is difficult for the resulting bar code to be automatically read.

OBJECT OF THE INVENTION

It is, therefore, an object of the present invention to provide a bar code printer for printing on a side marking of a film frame number bar codes which are sharp and can be accurately automatically read.

SUMMARY OF THE INVENTION

The above and other objects of the present invention are achieved by providing a bar code printing apparatus for printing a latent image of a bar code in a side margin of a film by the use of a light-emitting element array comprising a rotary encoder driven by the moving film to output encoder pulse signals in two different phases; a direction discrimination means for detecting the direction in which the film is transported based on the encoder pulse signals to output a forward direction pulse signal indicating that the film is being transported in a forward direction and a reverse direction pulse signal indicating that the film is being transported in a reverse direction, every predetermined length of transported film; and an up-down counter for counting up either of the forward direction and reverse direction pulse signals and counting down the other, thereby correctively regulating a transported length of the film in the lengthwise direction.

The direction discrimination means comprises a clock pulse signal generating circuit for generating clock pulse signals at a frequency higher than that at which the encoder pulse signal is output, a delay circuit for slightly delaying the clock pulse signal to output it as a delayed clock pulse signal, a first latch circuit for latching at least one of the encoder pulse signals in two different phases in synchronism with the clock pulse signal to output a transportation signal, a second latch circuit for the latch condition signal, and two AND gates, each connected to the first and second latch circuits and the delay circuit, for outputting the forward direction pulse signal and the reverse direction pulse signal, respectively.

The AND gates may be replaced by two monostable multivibrators for outputting the forward direction pulse signal and the reverse direction pulse signal, respectively, at a frequency lower than that at which the clock pulse signal is generated.

Preferably, the bar code printing apparatus is provided with a monitoring means for monitoring operating conditions of the transportation pulse signal generating means based on whether the transportation pulse signal generating means receives the latch signal from the counting means at the time of generation of the synchronizing signal.

A printing head for the bar code printing apparatus preferably comprises a light-emitting element array which comprises a plurality of light-emitting units, each unit including a plurality of light-emitting elements for emitting and mixing light having different wavelengths so as to provide monocolor printing light. The light-emitting unit is associated with a light source circuit comprising at least two in-series circuits, one of which includes at least two of the light-emitting elements connected in parallel, and a color tone regulating circuit having a variable resistor and a light-emitting element connected in series, the color tone regulating circuit being connected in parallel to one of the in-series circuits; a regulating means for regulating an output voltage of a power source for supplying current to energize the light-emitting elements so as to control the quantity of light from the light-emitting elements; and a switching element for actuating the light-emitting elements all at once.

The rotary encoder is driven by a film transported in a lengthwise direction to output encoder pulse signals in two different phases. The encoder pulse signal in at least one of the two phases is latched in synchronism with a clock pulse signal provided at a frequency lower than that at which the encoder pulse signal is output. By latching the encoder pulse signal in such a manner, even if the rotary encoder considerably oscillates in both directions of rotation, only one transporting condition can be detected between two consecutive clock pulse signals. Accordingly, the latched output is used as a transportation signal to indicate in which direction the film is transported or moved. The AND gate provides a forward or reverse direction signal from a logical product of a transportation signal from the latch circuit, a delayed transportation signal delayed by the delay circuit, an encoder pulse signal in the other phase, and a delayed clock pulse signal. The first two of the four signals act to cause the AND gate to open when a pulse signal from the rotary encoder rises for a period on which the clock pulse signal is generated. The third acts to determine which one of the two AND gates should be opened. The last is transmitted through the open AND gate as a forward or a reverse direction pulse signal.

Each monostable multivibrator is triggered by a pulse signal from the latch circuit to output a forward or a reverse direction pulse signal at a frequency lower than that at which the clock pulse signal is generated.

By providing a synchronizing pulse signal for every predetermined length of transported film, a failure of the transportation pulse signal generating means can be detected based on the fact that another synchronizing pulse signal is generated before a predetermined number of transportation pulse signals are counted up by a counter. By counting pulse signals obtained by frequency dividing the transportation pulse signals after correcting a reversed movement of film when the film is moved in the reverse direction, the counter is effectively prevented from miscounting. This increases the accuracy with which the operation of the transportation pulse signal generating means is monitored.

To provide a synchronizing signal, a photosensor is preferably used in cooperation with a chattering prevention circuit so as to prevent detection errors due to noises caused by chattering of the film or folded edges of the film.

In the light source circuit, by changing the current flowing through the light-emitting elements, an exposure time is suitably controlled to make a proper exposure in accordance with the type or the speed of the film. This eliminates blurring of the printed bar code image. Because of a single switching element used to energize the light-emitting elements all at once, the light source circuit is simplified in structure. It is preferable to incorporate a power source checking circuit to detect an abnormality of a power source circuit so as to prevent the bar code printing apparatus from making substandard prints.

BRIEF DESCRIPTION OF THE DRAWINGS

The above and other objects and features of the present invention will be apparent from the following description of preferred embodiments when taken in conjunction with the accompanying drawings, wherein like parts or elements are designated by like reference characters throughout the views of the drawings and in which:

FIG. 6 is a diagram of a checking circuit in cooperation with the power circuit of FIG. 5;

DETAILED DESCRIPTION OF PREFERRED EMBODIMENTS ACCORDING TO THE INVENTION

Figure 1:
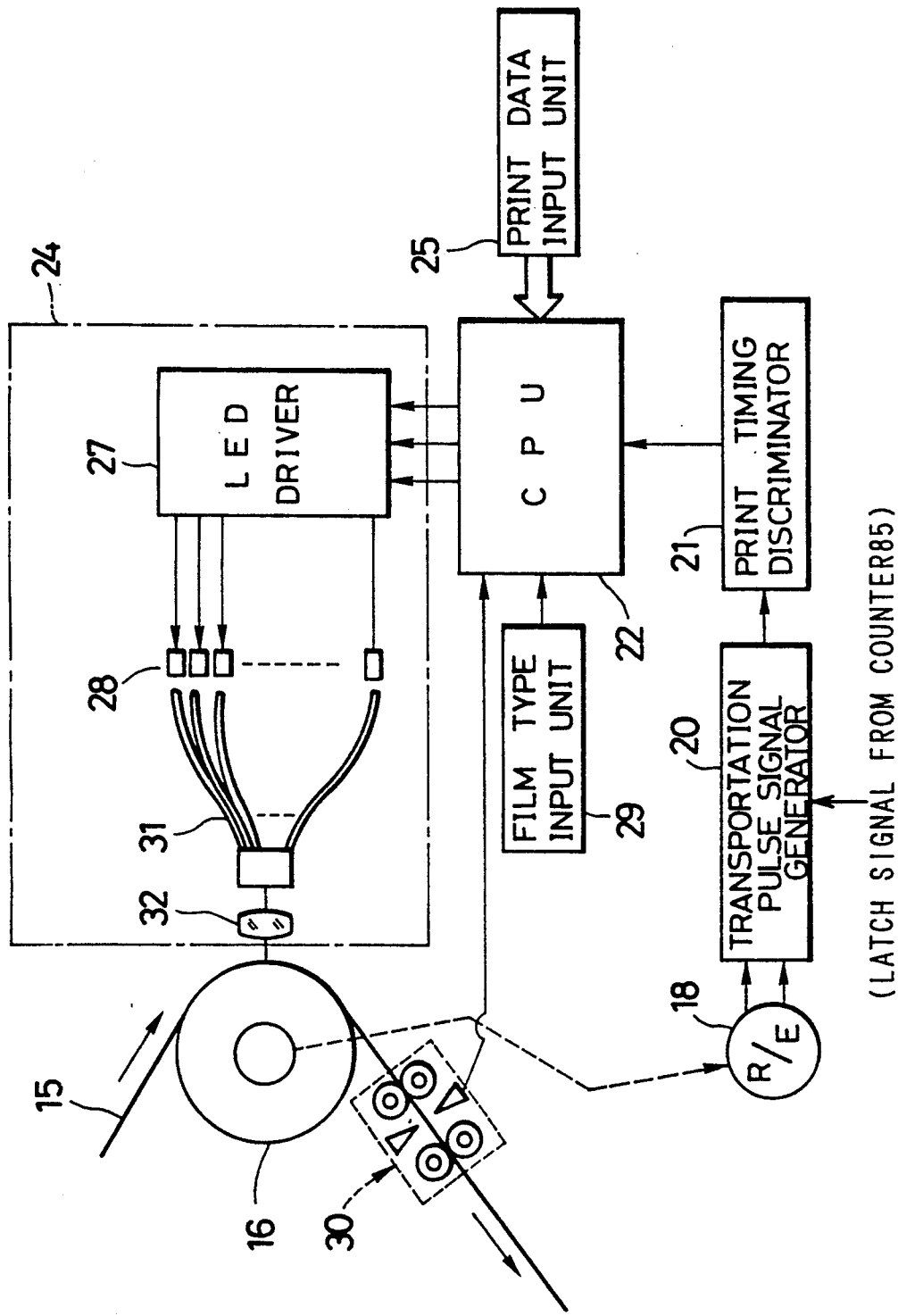
FIG. 1 is a schematic illustration showing a side printer in accordance with the present invention.

Referring now to the drawings, and in particular to FIG. 1, a side printer according to the invention is shown, which is used in printing bar codes in a side margin of a film. A film 15 is transported at a constant speed in one direction (which is hereinafter referred to as a forward direction) shown by an arrow, by means of a measuring roller 16. The rotation of the measuring roller 16 is monitored by a rotary encoder 18 which is adapted to output either of two phase signals indicating a transported length of film to a pulse generator 20. The pulse generator 20 outputs pulse signals in a number proportional to the transported length of film, to a print timing discriminator 21.

The print timing discriminator 21, which includes a counter for counting the pulse signals from the pulse generator 20, outputs a timing pulse signal to CPU 22 upon having counted a predetermined number of pulse signals. Upon receiving the timing signal, CPU 22 outputs an instruction signal for causing an exposure apparatus 24 of the side printer to make an exposure. CPU 22 is connected with a printing data input unit 25 in which print pattern data and various other necessary data are stored in its self-contained memory. When instructing the exposure apparatus 24, CPU 22 reads out the print pattern data from the print pattern data setting unit 25 and sends it to the exposure apparatus 24.

The exposure apparatus 24 is provided with an LED driver 27 for selectively lighting LED array 28 to emit light in accordance with print pattern data, upon receiving the print instruction signal. The pulse generator 20, as will be described in detail later, is equipped with features for detecting the reverse transportation of film and correcting the reverse transportation of film. Owing to the provision of these features, the transported length of film in the forward direction is accurately detected even if the film is accidentally intermittently transported or reversed, thereby enabling the print timing discriminator 21 to output a print timing signal to CPU 22 at an accurate timing according to the transported length of film.

A film type data input unit 29 is used to input data pertaining to the type of film to CPU 22, including the sensitivity or speed of film and the number of exposures. In accordance with this data, CPU 22 actuates the LED driver 27 to selectively energize LED array 28 so as to form a latent image in the film 15 with a controlled exposure. CPU 22 also controls a cutter 30 so as to cut off the film 15 to rolls of films having a predetermined length or a predetermined number of frames.

Light emanating from each LED of the LED array 28 is transmitted by way of a flexible light guide 31 in the form of a fiber bundle comprising a considerably great number of optical fibers and emitted from the end of the light guide 31 toward the film 15. The light in the form of a small dot from the light guide 31 is focussed on a margin of the film 15 so as to create a latent image of a small dot. The LED driver 27 selectively lights the LEDs of the LED array 28 to form a light pattern of a numeral or a bar code on the film 15 travelling at a constant speed.

Figure 2:
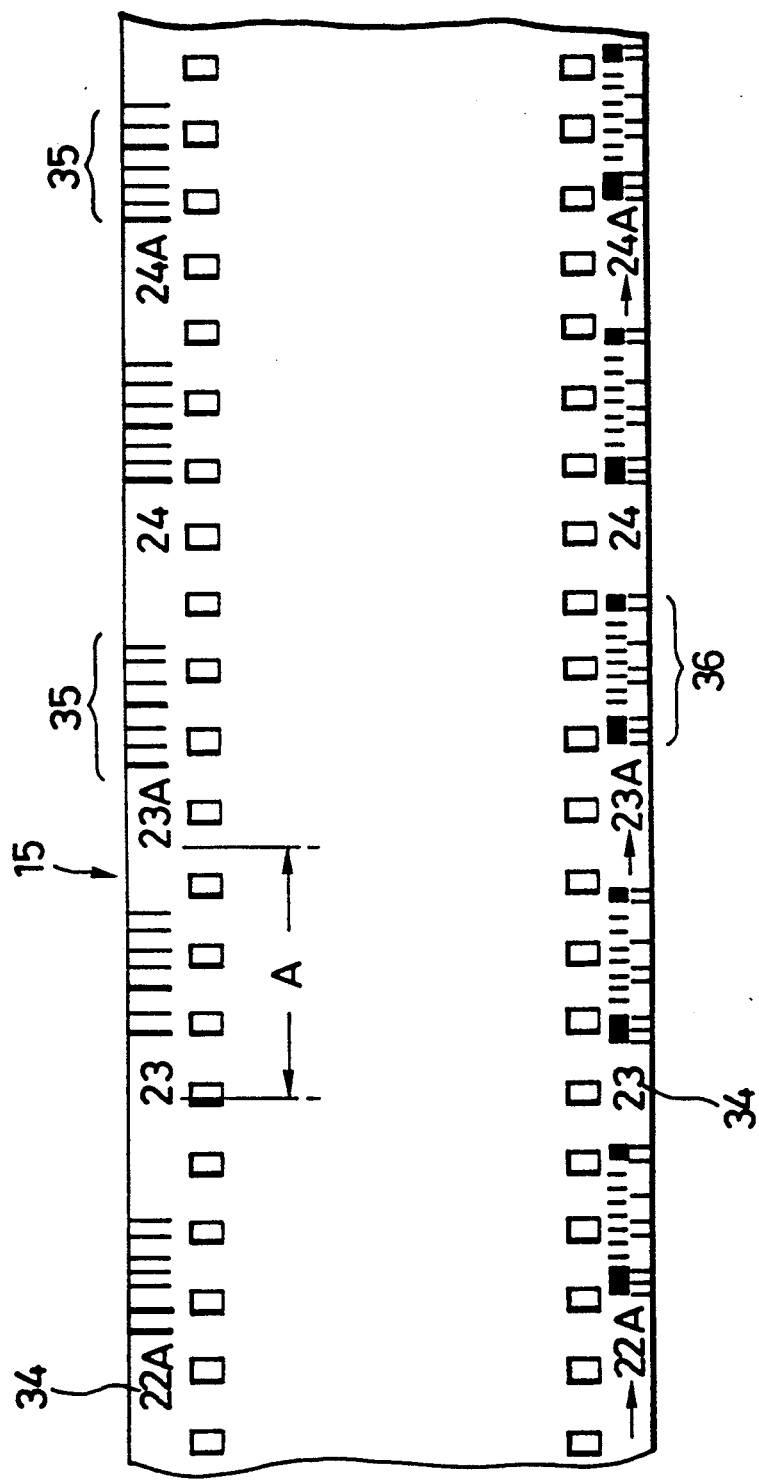
FIG. 2 is an illustration showing part of a film on which patterns or bar codes are side printed.

Referring now to FIG. 2, illustrating a portion of a film on which frame numbers and bar codes are printed by the side printer constructed as above, the film 15 is formed with perforations at regular spacings in both side margins. Between each row of perforations and a side edge of the film 15, there are printed frame numbers 34, with or without alphabetical characters, at regular spacings A. Just after each frame number 34 printed in one side margin, for example in the upper side margin as viewed in FIG. 2, there is printed a bar code 35 indicating the frame number 34. The bar codes 35 are printed at the same spacings A as those for the frame numbers. Further, in the other side margin, for example the lower side margin in this example, there are printed DX codes 36, which are well known in the photographic art. These bar codes 35 and 36 are capable of being read by any of various optical readers well known in the art.

Figure 3:
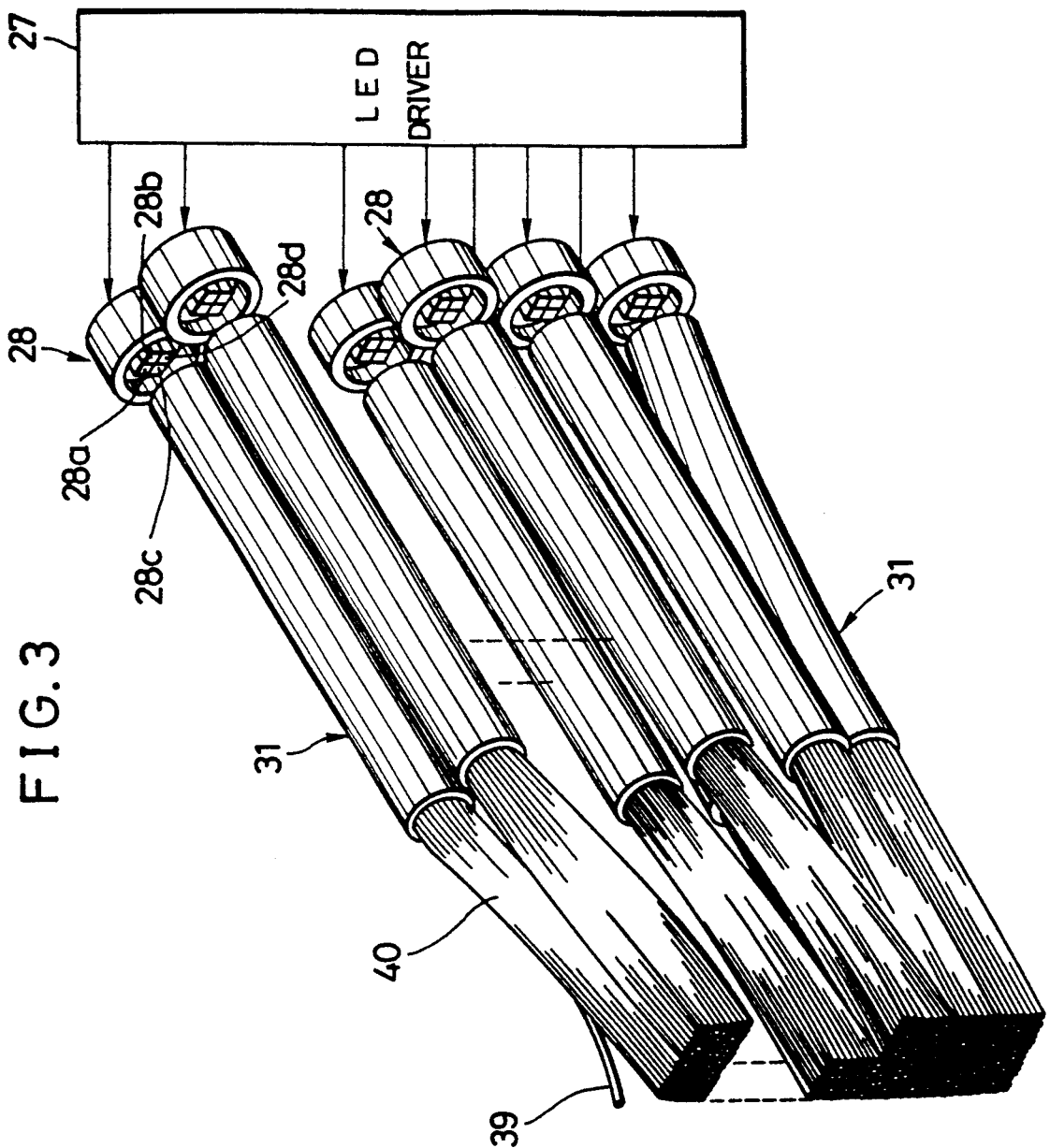
FIG. 3 is a schematic illustration showing a printing head forming a part of the exposure apparatus of the side printer of FIG. 1.

Referring now to FIG. 3, illustrating details of a printing head forming a part of the exposure apparatus, in particular the LED array and the light guide assembly, the LED array 28 comprises a number of LED units each including four different color LEDs, namely green light-emitting diodes 28a and 28b and red light-emitting diodes 28c and 28d. Each flexible light guide 31 is made from a fiber bundle 40 comprising a considerably great number of thin optical fibers 39.

Each fiber bundle 40 has its incidence end formed in a circle and its exit end formed in a square. The square ends of the fiber bundles 40 permits forming a close arrangement of the fiber bundles at their exit ends, thereby creating, when lighting the LEDs of the LED array 28 all at once, a sharp light pattern of a thin straight line. Because the fibers 39 of each fiber bundle 40 are intermingled, light emitted from the fiber bundles 40 has a mixed color of green and red.

The printing head thus constructed is capable of printing frame numbers with or without alphabetical characters, as well as the frame number bar codes 35. That is, because each fiber bundle 40 forms a square dot, a light pattern of a number or a character can be formed on the travelling film 15 by selectively activating and deactivating the LEDs of the LED array 28.

Figure 4:
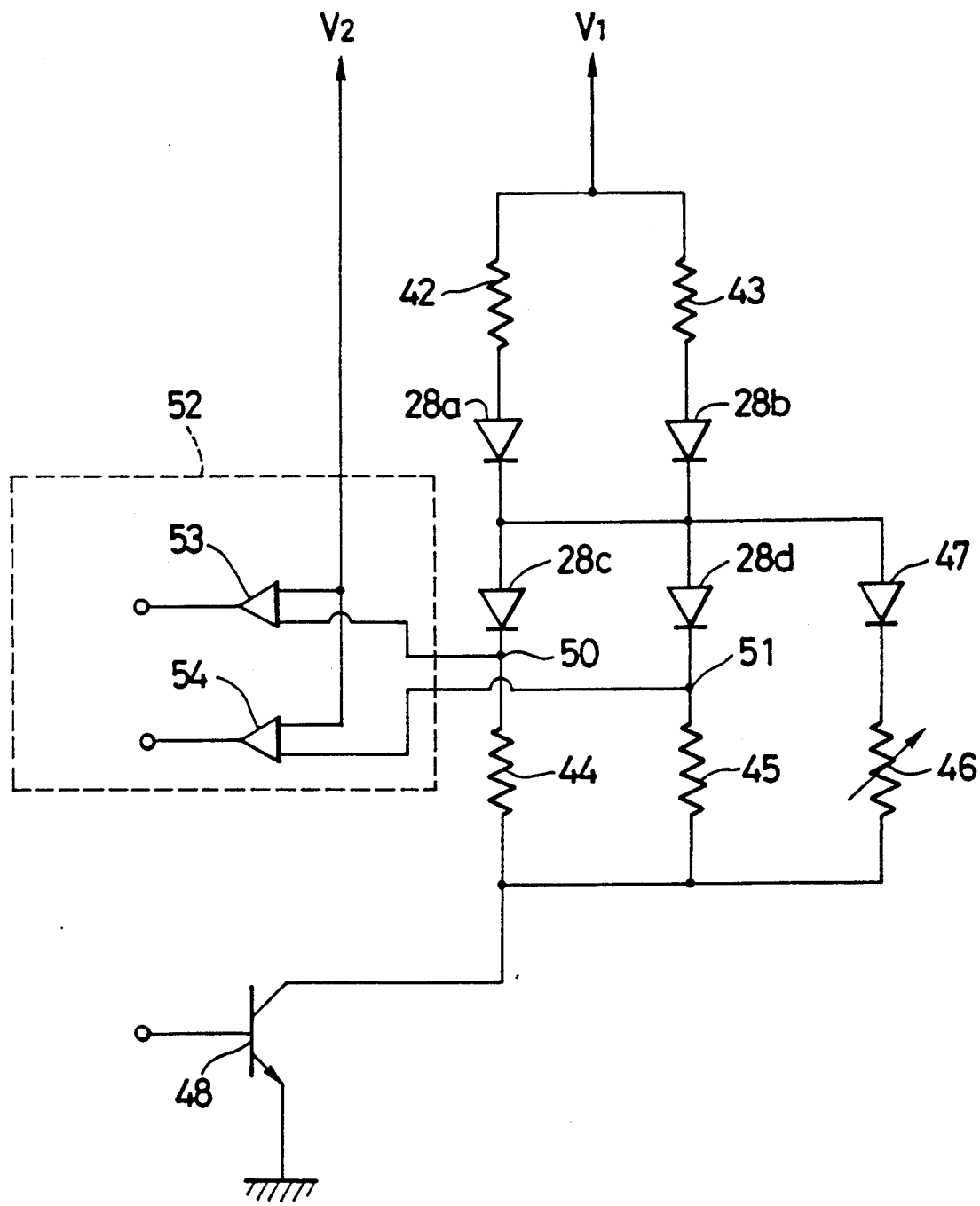
FIG. 4 is a diagram of a circuit for driving an LED unit.

Each LED unit comprising four LEDs 28a-28d is controlled by an LED drive circuit, which can have a structure as shown in FIG. 4. The LED driver 27 of FIG. 3 comprises a plurality of identical such LED drive circuits, one for each LED unit. The green LEDs 28a and 28b and the red LEDs 28c and 28d are, respectively, in parallel connection. The anodes of the green LEDs 28a and 28b are connected to the cathodes of the red LEDs 28c and 28d, respectively. The LEDs 28a-28d are connected in series with resistors 42-45, respectively. A variable resistor 46, which is connected in parallel with respect to the LEDs 28c and 28d, controls current flow through the respective LEDs 28a-28d in various required proportions so as to control the tone of color of the light emitted from the light guide 31.

A corrective LED 47, which is connected in series with the variable resistor 46 and in parallel with the red LEDs 28c and 28d, acts to minimize the change of ratio of current flowing through the green LEDs 28a and 28b and the red LEDs 28c and 28d, respectively, due to the change of voltage V1 applied to the LEDs 28a-28d, thereby preventing the tone of color of light emitted from the light guide 31 from changing. That is, because of the non-linearity of current-to-voltage characteristic of LEDs, the variable resistor 46 changes the ratio of current flowing through the green LEDs 28a and 28b and the red LEDs 28c and 28d due to the change of voltage V1, resulting in the change of the tone of color of the light from the light guide 31. When using a corrective LED 47 having the same current-to-voltage characteristic curve as the red LEDs 28c and 28d, the change of the ratio of current is minimized. A transistor 48 is used to drive the LEds 28a-28d all at once.

The drive circuit includes monitoring nodes 50 and 51 between the red LED 28c and the resistor 44 and the red LED 28d and the resistor 45, respectively. Voltages present at the monitoring nodes 50 and 51 are detected and compared with a reference voltage V2 applied to comparators 53 and 54 in an error detecting circuit 52. If a voltage present at the monitoring node 50 or 51 is lower than the reference voltage V2 when the transistor 48 is conductive, the comparator 53 or 54 outputs a warning signal. According to the drive circuit thus constructed, if either of the red LEDs 28c and 28d is broken, no current will flow through that monitoring node 50 or 51 which is connected to the broken red LED 28c or 28d. If either or both of the green LEDs 28a and 27b are broken, the voltages present at the monitoring nodes 50 and 51 will be lowered. Therefore, in the event of breakage of any LED, at least one of the comparators 53 and 54 will output a warning signal.

Figure 5:
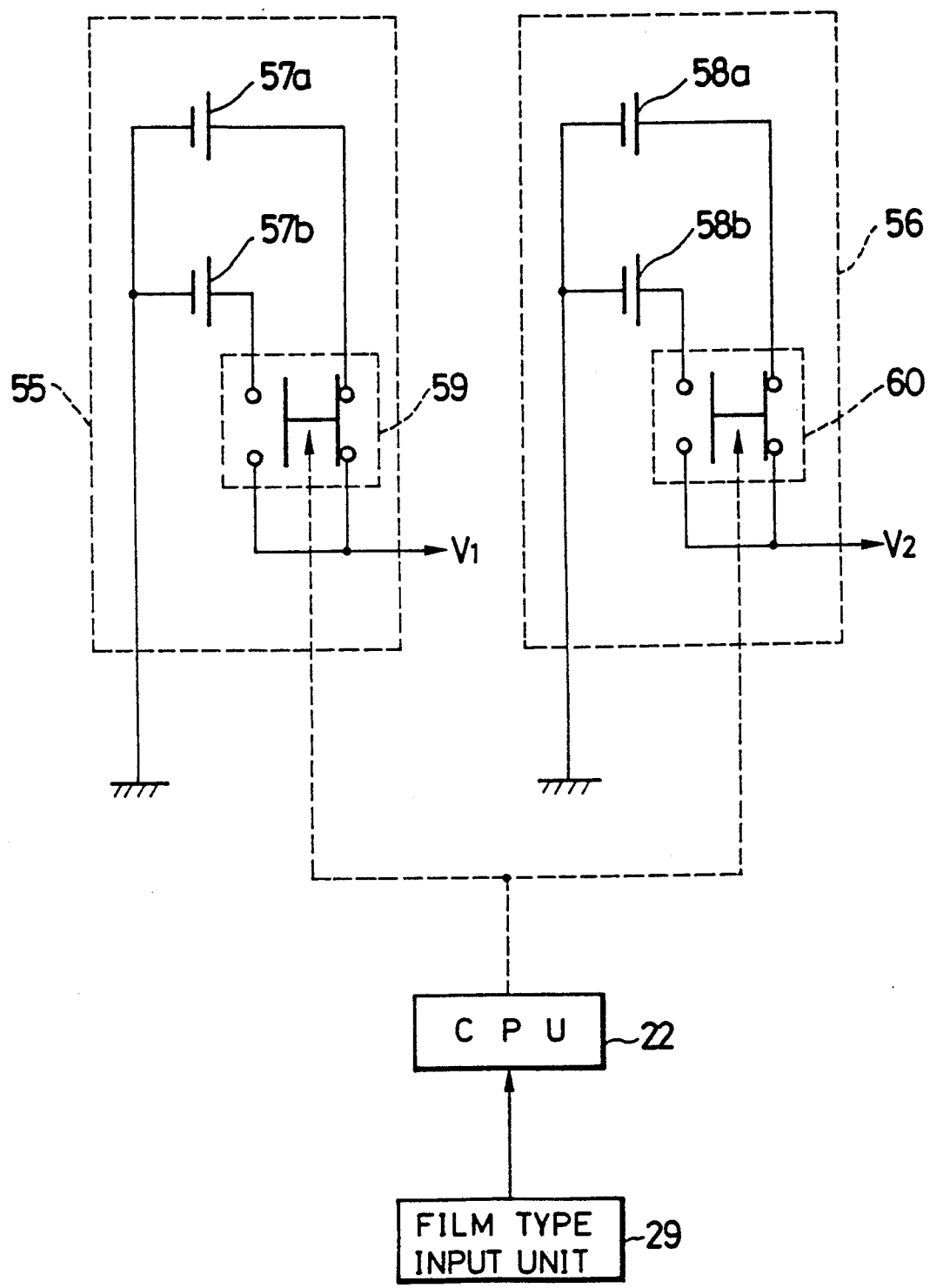
FIG. 5 is a diagram of a power circuit for the LED driving circuit of FIG. 4.

Referring now to FIG. 5, illustrating a power source for providing the drive and reference voltages V1 and V2, the power circuit comprises an LED drive voltage generating circuit 55 for providing a voltage V1 to the LEDs 28a-28d and a reference voltage generating circuit 56 for providing a reference voltage V2 to the error detecting circuit 52. Each voltage generating circuit 55, 56 comprises a high voltage source 57a, 58a for generating a high voltage V1, V2 a low voltage source 57b, 58b for generating a low voltage V1, V2, and switching means 59, 60 for selectively outputting the high or the low voltage V1, V2. The switching means may be any type of switch, such as CMOS analog switches, relay switches or the like, which are all well known in the art.

When inputting data to CPU 22 pertaining to the type of film, via the film type data input unit 29, a signal is output to the voltage generating circuits 55 and 56 to actuate the switching means 59 and 60 so as to select high or low voltages V1 and V2 in accordance with the sensitivity or film speed of the film type. For example, the voltage generating circuits 55 and 56 select the low voltage sources 57b and 58b, respectively, for a high speed of film, or the high voltage sources 57a and 58a, respectively, for a low speed of film.

Each voltage generating circuit 55, 56 is provided with a power checking circuit such as that shown in FIG. 6. The power checking circuit includes switching means 62 and 63 cooperating with the switching means 59 or 60 of the voltage generating circuits 55 or 56, respectively. When the high voltage sources 57a and 58a are selected, the switching means 62 and 63 connect outputs from the voltage generating circuits 55 and 56 to the resistor 65 and 66, respectively. On the other hand, when the low voltage sources 57b and 58b are selected, the switching means 62 and 63 connect outputs from the voltage generating circuits 55 and 56 to the resistors 67 and 68, respectively. A voltage will be present at a monitoring node 69 or 70 between resistors 65 and 66 for high voltage or 67 and 68 for low voltage. Resistances of the resistors 65-68 are selected so as to present the same voltage at the monitoring nodes. For example, when the voltage sources provide 24 V and 12 V, respectively, the resistors 65, 66, 67 and 68 are designed to have resistances of 3Ω, 1Ω, 1Ω and 1Ω, respectively, so as to present 6 V at the monitoring nodes 69 and 70 at any time. Accordingly, the reference voltages $V_L$ and $V_H$ of a power checking circuit 72 are maintained at constant values. This allows the checking of more than one power source by a single checking circuit.

The power checking circuit 72 connected at the monitoring nodes 69 and 70 compares a monitoring voltage at the monitoring node 69 or 70 with checking voltages $V_L$ and $V_H$ by means of a high voltage analog comparator 73 and a low voltage analog comparator 74. If the monitoring voltage at the monitoring node 69 or 70 is higher than the high reference voltage $V_H$ or lower than the low reference voltage $V_L$, then the power checking circuit 72 outputs a warning signal.

In operation of the drive circuit constructed as above, the variable resistor 46 is adjusted to regulate the tone of color of light emitted from the LED array 28 to a desired tone of color. In the print data input unit 25, there is stored printing data of patterns of characters and bar codes to be printed. The printing data is transferred from a computer, or manually. In the film type data input unit 29, there is stored data pertaining to characteristics of the film 15, such as film speed. CPU 22 reads out necessary data from the print data input unit 25 and the film type data input unit 29.

When CPU 22 reads data pertaining to the film type of the film 15, it selects one of the high and low voltage sources of each voltage generating circuit 55, 56 in accordance with the type of the film 15. CPU 22 selects the low voltage sources 57b and 58b for a low speed of film, or the high voltage sources 57a and 58a for a high speed of film. At the same time, the power checking circuit changes the switching means 62 and 63 to connect the high voltage side (left side) upon selecting the high voltage sources 57a and 58a, or to connect the low voltage side (right side) upon selecting the low voltage sources 57b and 58b.

The print timing discriminator 21, upon receiving a signal provided each time the cutter 30 is operated to cut the rough film 15 to a predetermined length of film strips, outputs a print start signal to CPU 22. Then, CPU 22 executes printing operations according to a predetermined sequence. To start printing, CPU 22, upon receiving a signal from the print timing discriminator 21, reads out necessary print pattern data from the print data input unit 25 and, based on this data, outputs a printing signal to the LED driver 27 so as to render the transistor 48 conductive, thereby exciting the LED units of the LED array 28 all at once with the selected voltage V1.

At this time, if any one of the LEDs 28a-28d of each LED unit of the LED array 28 or their associated wirings has been broken, the error detecting circuit 52 issues a warning in the manner previously described. Mixed colors of light from the light guides 31 forms a light pattern which is projected onto a side margin of the film 15, thereby creating a latent image of the pattern in the film 15.

For a different film speed, CPU 22 reads out data pertaining to the different film speed so as to change the voltages V1 and V2 correspondingly to the speed of film. Thereafter, CPU 22 executes the same operations as described above for the film 15.

Figure 7:
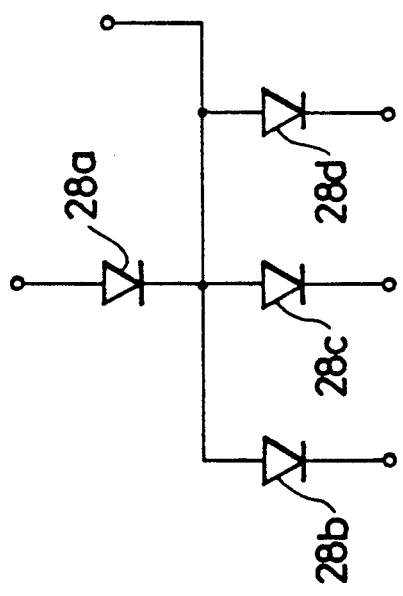
FIGS. 7 and 8 are diagrams showing variations of the circuit for driving an LED unit of FIG. 4, respectively.
Figure 8:
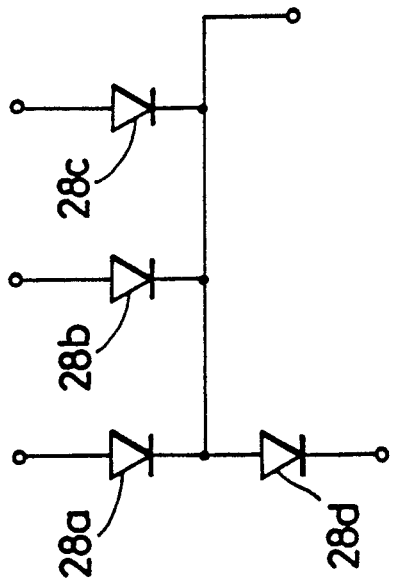

It is apparent from the above description that the provision of the corrective LED 47 effectively serves to maintain the mixed color of light unchanged in tone even though the voltage V1 changes. The LEDs 28a-28d of each LED unit of the LED array 28 may be connected to one another as shown in FIG. 7 or as shown in FIG. 8, instead of the connection shown in FIG. 4.

Figure 27:
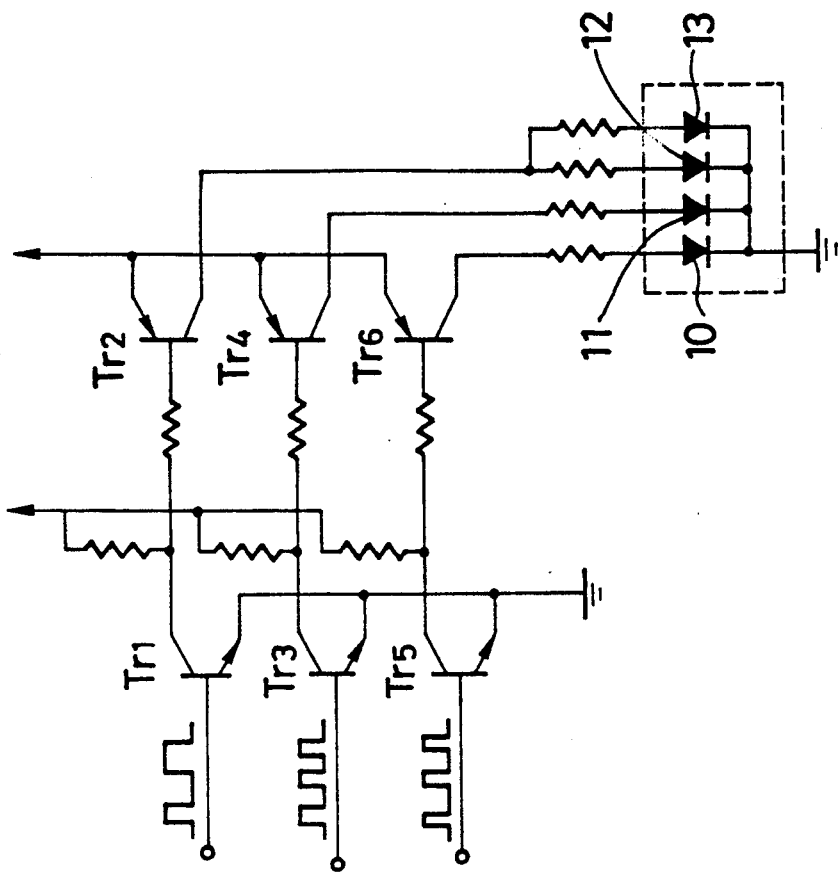
FIG. 27 is a diagram showing a conventional LED drive circuit.

As noted above, the LED driving circuit of FIGS. 4-8 comprises a single transistor 48, which is used to drive the LEDs 28a-28d all at once. This is to be contrasted with prior art LED drive circuits as described above and as pictured in the accompanying FIG. 27, where plural transistors $Tr_1$-$Tr_6$ are used to drive plural LEDs 10-13.

Figure 9:
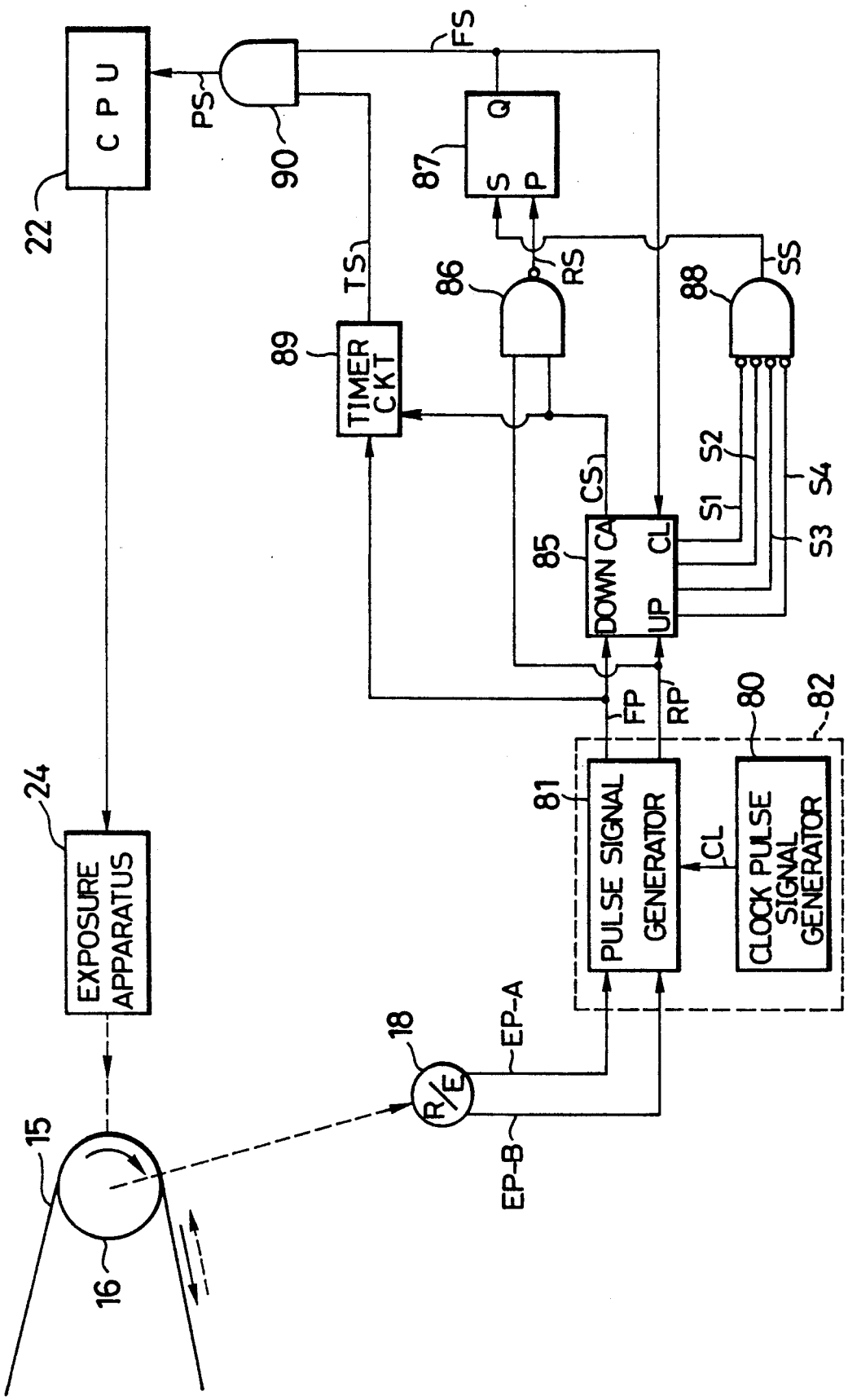
FIG. 9 is a diagram showing details of a pulse generator and a print timing discriminator incorporated in the side printer of FIG. 1.

The exposure apparatus 24 itself, constructed as described above, is capable of making a sharp print pattern. For most favorable printing, however, the transported length of film should be measured with a high degree of accuracy. For accurate measuring, a reverse correction means is provided in association with the pulse generator 20 and the print timing discriminator 21. As shown in FIG. 9, the film 15 is normally transported in the forward direction at a constant speed. The film 15 travels without any slippage between it and the measuring roller 16, and therefore rotates the measuring roller 16 at a constant speed of rotation. But the film may possibly move in the reverse direction, shown by a dotted line, when a film transporting system (not shown) stops or when the tension on the film 15 changes.

The rotary encoder 18 outputs encoder pulse signals EP-A and EP-B (see also FIG. 11) in A phase and B phase, respectively, with the rotation of the measuring roller 16. These encoder pulse signals EP-A and EP-B differ in phase by 90°. These encoder pulse signals EP-A and EP-B are fed to a pulse signal generator 81, along with a clock pulse signal CL provided by a clock pulse signal generator 80. A direction discriminator 82 is comprised of the clock pulse signal generator 80 and pulse signal generator 81. The direction discriminator 82 discriminates the direction in which the film 15 is moving based on the encoder pulse signals EP-A and EP-B and the clock pulse signals CL, to output forward direction pulse signals FP or reverse direction pulse signals RP, one for each predetermined length of the film 15.

The reverse direction pulse signals RP are fed to an up-terminal of an up-down counter 85 and up-counted thereby, whereas the forward direction pulse signals FP are fed to a down-terminal of the up-down counter 85 and down-counted thereby. A carry signal CS from the up-down counter 85, as well as the reverse direction pulse signals RP, are fed to a NAND gate 86. The NAND gate 86 outputs a reset signal RS to a flip-flop 87 for resetting it. The flip-flop 87 outputs from its Q terminal a signal FS to a clear terminal CL of the up-down counter 85. When the flip-flop 87 is reset, it changes the signal FS to a high level (H) so as to cause the up-down counter 85 to count pulse signals. Signals S1-S4 from four output terminals of the up-down counter 85 are fed to an AND gate 88. When a binary output is "0" the AND gate 88 changes its output signal SS to a high level (H) so as to set the flip-flop 87. When the flip-flop 87 is set, it changes the signal FS to a high level (H), thereby stopping the up-down counter 85.

The forward direction pulse signals FP are also fed to a timer circuit 89. The timer circuit 89 outputs a signal TS to an AND gate 90, which also receives the signal FS from the flip-flop 87. The AND gate 90 outputs a signal PS to CPU 22. CPU 22, so long as it receives a signal PS of a high level (H) from the AND gate 90, continuously provides a print signal to the LED driver 27.

In the side printing apparatus described above, the up-down counter 85 starts to up-count pulse signals upon receipt of a first reverse direction pulse signal RP from the pulse generator 81, or to down-count pulse signals upon the provision of a first forward direction pulse signal FP from the pulse generator 81. Before the up-down counter has down-counted to zero (0), that is, until the film has been transported in the forward direction by a length that the film has been reversely moved, any exposure is prohibited so as to prevent double exposures. The timer circuit 89 can be actuated upon provision of a carry signal CS from the up-down counter 85 so as to output a signal to CPU 22, thereby starting printing.

Figure 10:
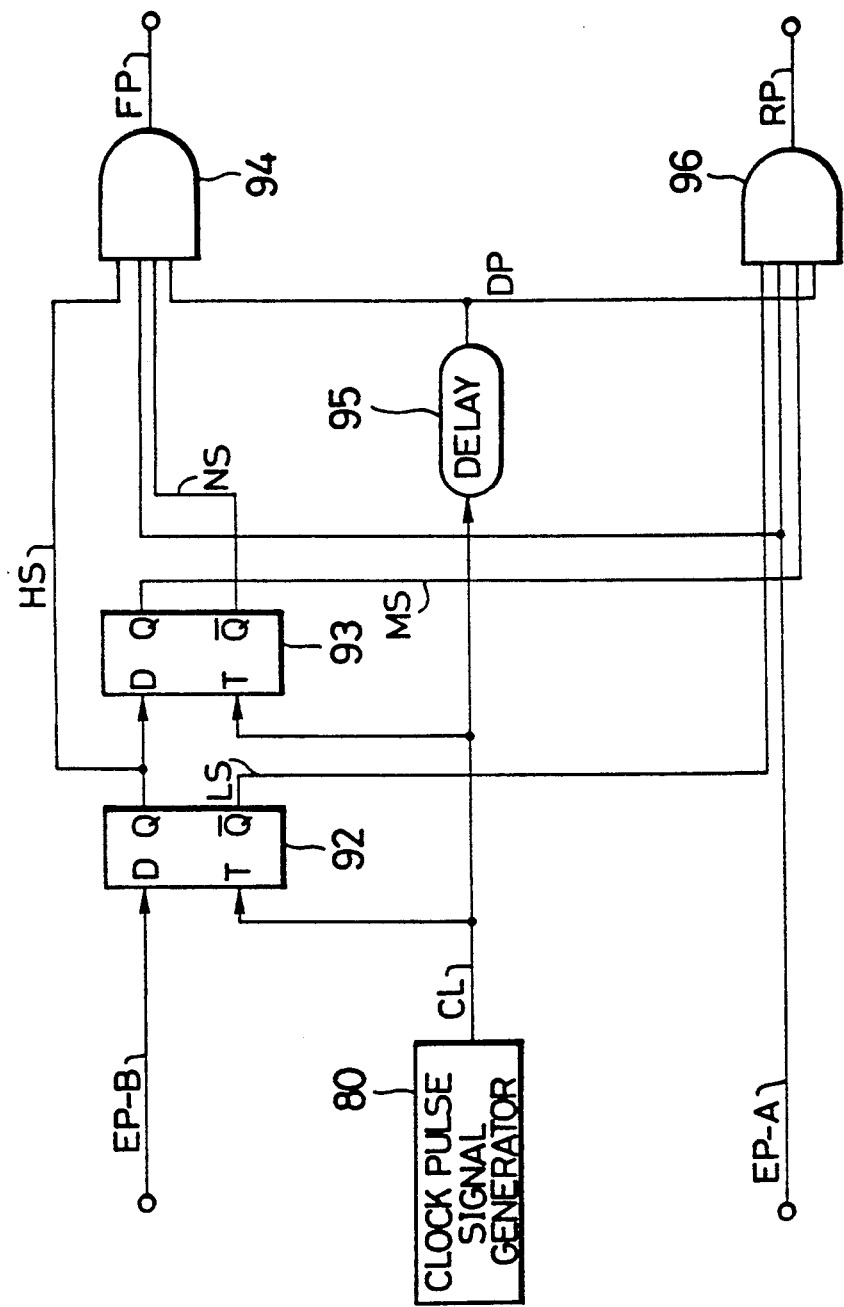
FIG. 10 is a diagram showing in greater detail part of the circuit diagram of FIG. 9.

The direction discriminator 82 is shown in detail in FIG. 10. Pulses in one phase, for example in the B phase, from the rotary encoder 18 are fed to the D-terminal of D-type flip-flop 92. Fed to the clock input terminal or T-terminal of the D-type flip-flop 92 is a clock pulse signal CL from the clock pulse generator 80. The D-type flip-flop 92 latches the encoder pulse signal EP-B when a clock pulse signal CL is rising and provides a film transportation condition signal HS from the Q-terminal. The D-type flip-flop 92 also outputs a signal LS, which is opposite in level to the signal HS from the Q-terminal, from the $\overline{Q}$-terminal thereof. Another D-type flip-flop 93, which is connected to the first D-type flip-flop 92, latches the film transportation condition signal HS from the Q-terminal of the D-type flip-flop 92 when a clock pulse signal CL is rising and outputs a latch condition signal MS from its Q-terminal.

An AND gate 94 is supplied with the output HS from the Q-terminal of the D-type flip-flop 92, encoder pulse signals EP-A in the A phase, an output signal NS from the $\overline{Q}$-terminal of the D-type flip-flop 93, and delayed clock pulse signals DP from a delay circuit 95. When all of the first three signals (pulse signals HS, EP-A and NS) are in a high level (H), the AND gate 94 transmits the delayed clock pulse signals DP as forward direction pulse signals FP. The delay circuit 95 delays the clock pulse signals CL from the clock pulse generator 80 for a predetermined interval and outputs them as the delayed clock pulse signal DP. The delay interval is selected to be shorter than the period of the clock pulse signal CL, for a reason described later. The delay circuit 95 comprises, for example, a plurality of IC gates connected to one another.

An AND gate 96 is supplied with the output LS from the $\overline{Q}$-terminal of the D-type flip-flop 92, encoder pulse signals EP-A in the A phase, an output signal MS from the Q-terminal of the D-type-flip-flop 93, and delayed clock pulse signals DP from a delay circuit 95. When all of the first three pulse signals LS, EP-A and MS are in a high level (H), the AND gate 96 transmits the delayed clock pulse signals DP as reverse direction pulse signals RP.

Figure 11:
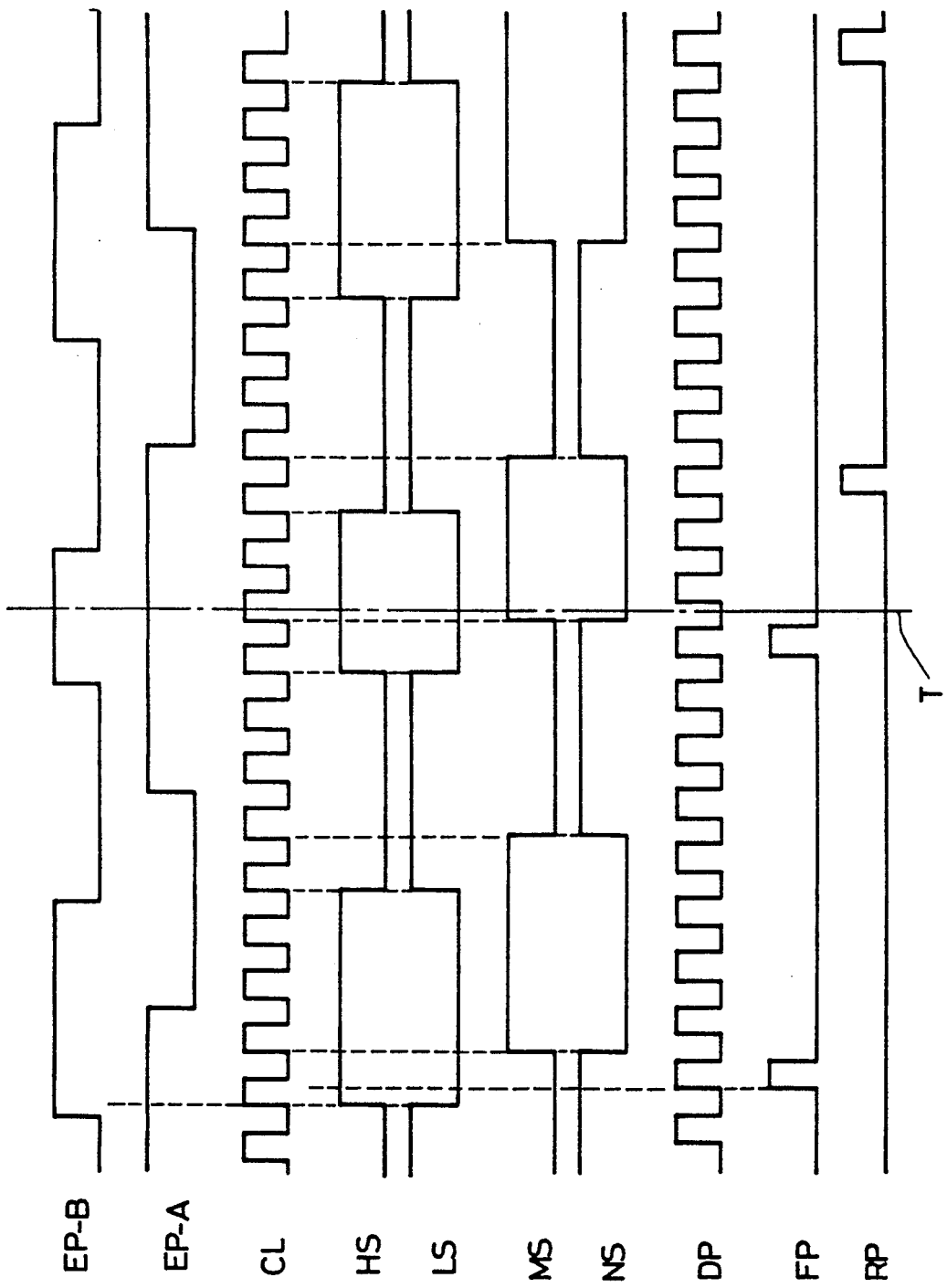
FIG. 11 is a timing chart showing various signals used in the circuit of FIG. 10.

Referring now to FIG. 11, illustrating a timing chart of various signals in the direction discriminator 82, the film 15 moves in the forward direction to the left of the line T and in the reverse direction to the right of the line T.

While the film 15 moves in the forward direction so as to rotate the rotary encoder 18 in the same direction, the rotary encoder 18 outputs encoder pulse signals EP-B in phase B. Upon the rising of the encoder pulse signal EP-B, the leading edge of a first clock pulse signal CL causes the D-type flip-flop 92 to change the output signal HS issuing from its Q-terminal to a high level (H) from a low level (L), and the leading edge of a subsequent clock pulse signal CL causes the D-type flip-flop 93 to change the output signal NS issuing from its $\overline{Q}$-terminal to a low level (L) from a high level (H). Between the changes of output signals HS and NS of the D-type flip-flops 92 and 93, an encoder pulse signal EP-A in phase A is maintained at a high level and the AND gate 94 receives one delayed clock pulse signal DP from the delay circuit 95. As a result, the AND gate 94 outputs one forward direction pulse signal FP.

If the film 15 moves in the reverse direction, thereby rotating the rotary encoder 18 in the same direction, upon the falling of the encoder pulse signal EP-B, the leading edge of a first clock pulse signal CL causes the D-type flip-flop 92 to change its output signal LS issuing from its Q̄-terminal to a high level (H) from a low level (L), and the leading edge of a subsequent clock pulse signal CL causes the D-type flip-flop 93 to change the output signal MS issuing from its Q-terminal to a low level (L) from a high level (H). Between the changes of output signal LS and MS of the D-type flip-flops 92 and 93, an encoder pulse signal EP-A in phase A is maintained at a high level and an AND gate 96 receives one delayed clock pulse signal DP from the delay circuit 95. As a result, the AND gate 96 outputs one reverse direction pulse signal RP.

Because a clock pulse signal CL latches an encoder pulse signal, it is essential that the period of clock pulse signal is sufficiently greater than the maximum period of the encoder pulse signal. However, because the clock pulse signals are counted by the up-down counter 8, the frequency at which a clock pulse signal is generated is lower than 10 MHz and because the clock pulse signal CL is delayed and transmitted as a forward direction pulse signal or a reverse direction pulse signal through the AND gate 64 or 66, the most desirable frequency is 1 MHz. A pulse width of the clock pulse signal CL has a close relationship to the delay time of the delay circuit 95 and the maximum pulse width is expressed by "pulse period"- "delay time"- "operating time of element". The pulse width, which is a duty rate, is most preferably 50%.

To obtain an output from the AND gate 94 or 96, the delay time of a clock pulse signal CL by the delay circuit 95 must be shorter than the pulse width of the clock pulse signal CL. For example, when the frequency at which the clock pulse signal CL is generated is 1 MHz and the duty rate is 50%, the delay time should be less than 0.5μ second.

Figure 12:
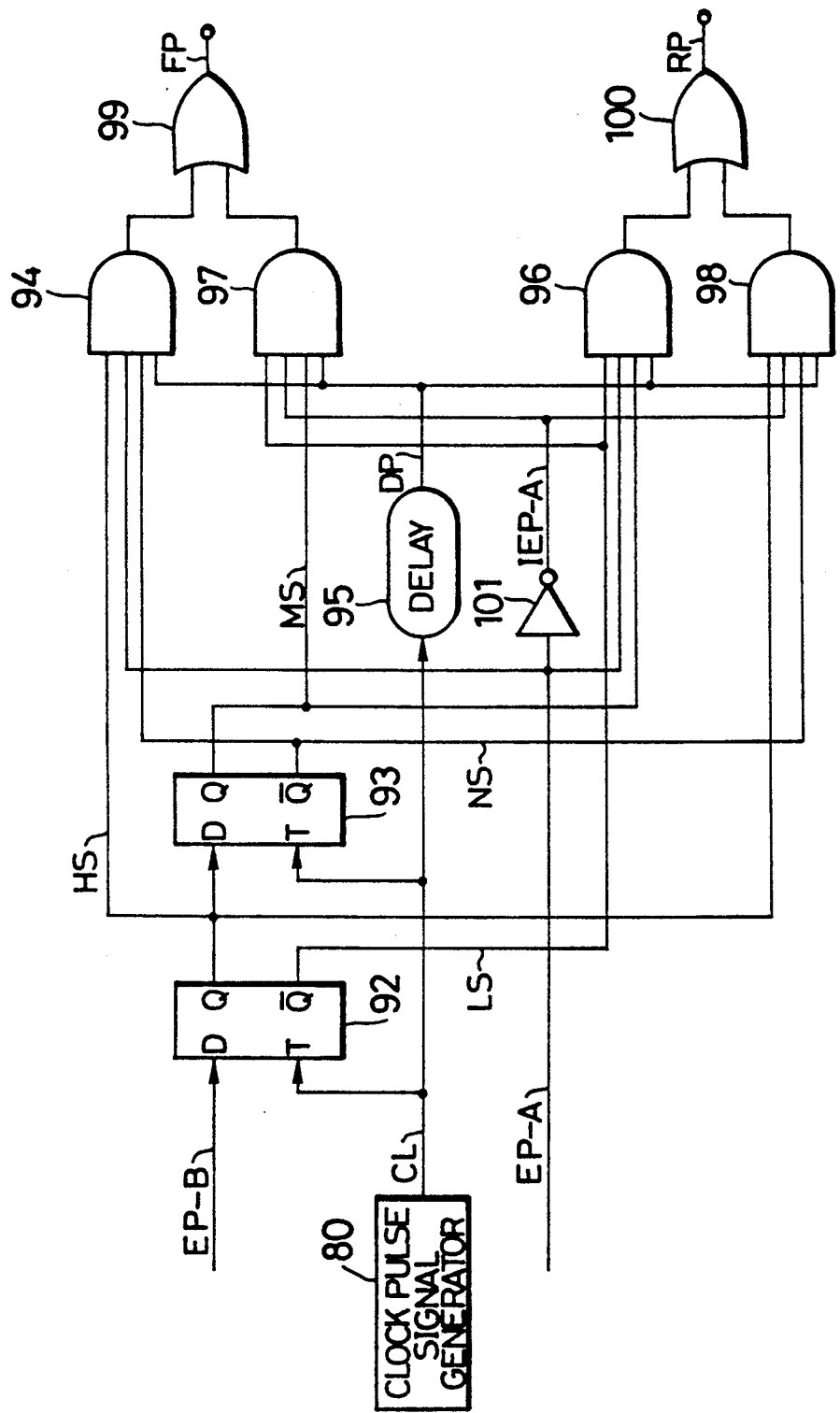
FIGS. 12 and 13 are diagrams showing variations of the circuit of FIG. 10.

Although in the direction discriminator 82 shown in FIG. 10 one forward or reverse direction pulse signal FP or RP is provided every encoder pulse signal EP-A, it is necessary to provide more than one forward or reverse direction pulse signal every encoder pulse signal in order to effect a precise measurement of the transported length of the film 15. To fulfill this requirement, it is preferred to incorporate another preferred direction discriminator, as shown in FIG. 12, in which AND gates 97 and 98, OR gates 99 and 100 and an inverter 101 are added to the direction discriminator 82 shown in FIG. 10. As shown, the inverter 101 acts to invert the polarity of encoder pulse signal EP-A in the A phase. The inverted polarity of encoder pulse signal IEP-A is fed to the AND gates 97 and 98. The AND gate 97 is further supplied with an output signal LS from the Q̄-terminal of the D-type flip-flop 92, an output signal MS from the Q-terminal of the D-type flip-flop 93 and a delayed clock pulse signal DP from the delay circuit 95, in addition to the inverted polarity of encoder pulse signal IEP-A. When at least one of the AND gates 97 and 94 provides an output signal, the OR gate 99 outputs a forward direction pulse signal FP to the up-down counter 85.

In a similar manner, the AND gate 98 is supplied with the inverted polarity of encoder pulse signal IEP-A from the inverter 101, an output signal HS from the Q-terminal of the D-type flip-flop 92, an output signal NS from the Q-terminal of the D-type flip-flop 93 and a delayed clock pulse signal DP from the delay circuit 95. When at least one of the AND gates 96 and 98 provides an output signal, the OR gate 100 outputs a reverse direction pulse signal RP to the up-down counter 85.

In this embodiment, the AND gate 94 outputs a pulse signal when an encoder pulse signal EP-B is rising and the AND gate 97 outputs a pulse signal when an encoder pulse signal EP-B is falling as the film 15 is forwarded, so that two forward direction pulse signals FP are output. Similarly, the AND gate 96 outputs a pulse signal when an encoder pulse signal EP-B is falling and the AND gate 98 outputs a pulse signal when an encoder pulse signal EP-B is rising as the film is reversed, so that two reverse direction pulse signals RP are output.

Figure 13:
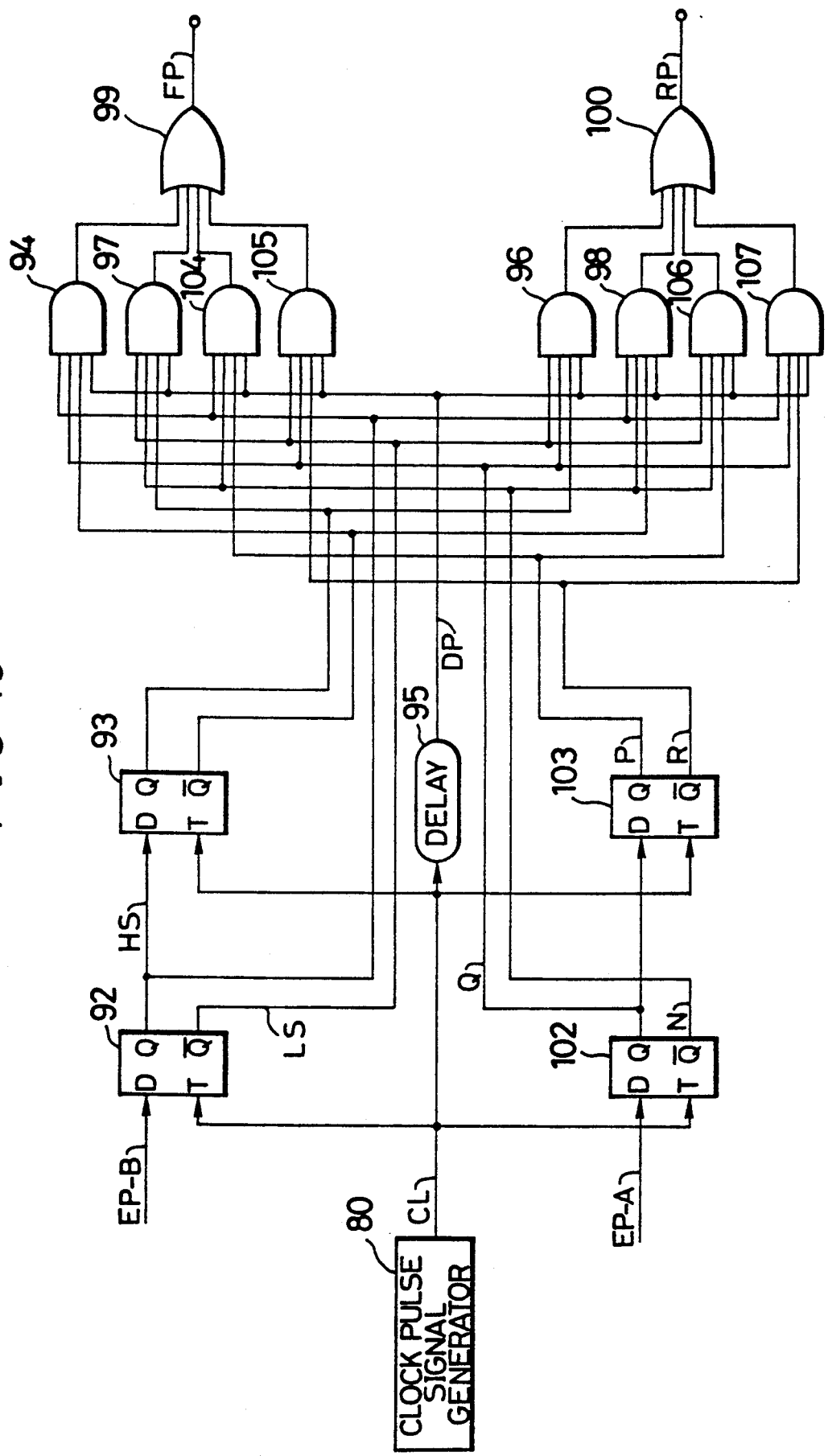

FIG. 13 shows another embodiment in which four forward or reverse direction pulse signals FP or RP are provided for every encoder pulse signal, in order to effect even more precise measurement of the transported length of the film 15. In this embodiment, D-type flip-flops 102 and 103 and AND gates 104-107 are added to the direction discriminator shown in FIG. 12. As shown, the D-type flip-flop 102 receives an encoder pulse signal EP-A at its D-terminal and a clock pulse signal CL at its clock terminal T. The D-type flip-flop 102 latches the encoder pulse signal EP-A at a timing of a clock pulse signal CL so as to output a condition signal from its Q-terminal. Another D-type flip-flop 103 latches an output from the Q-terminal of the D-type flip-flop 102 at a timing of another clock pulse signal CL.

The AND gate 104 is supplied with signals HS, N and P output from the Q-terminal of the D-type flip-flop 92, Q̄-terminal of the D-type flip-flop 102 and the Q-terminal of the D-type flip-flop 103, respectively, and receives a delay clock pulse signal D from the delay circuit 95. Output from the AND gate 104 is sent to the OR gate 99. Similarly, the AND gate 105 receives signals LS, Q and R output from the Q̄-terminal of the D-type flip-flop 92, Q-terminal of the D-type flip-flop 102 and the Q̄-terminal of the D-type flip-flop 103, respectively, and receives a delay clock pulse signal DP from the delay circuit 95. Output from the AND gate 105 is sent to the OR gate 99. The OR gate 99 transmits as a forward direction pulse signal any one of the outputs from the AND gates 94, 97, 104 and 105.

The AND gate 106 receives signals LS, N and P output from the Q̄-terminal of the D-type flip-flop 92, Q̄-terminal of the D-type flip-flop 102 and the Q-terminal of the D-type flip-flop 103, respectively, and receives a delay clock pulse signal DP from the delay circuit 95. Output from the AND gate 106 is sent to the OR gate 100. Similarly, the AND gate 107 is connected to outputs HS, Q and R from the Q-terminal of the D-type flip-flop 92, Q-terminal of the D-type flip-flop 102 and the Q̄-terminal of the D-type flip-flop 103, respectively, and receives a delay clock pulse signal DP from the delay circuit 95. Output from the AND gate 107 is sent to the OR gate 100. The OR gate 100 transmits any one of outputs from the AND gates 94, 97, 104 and 105 as a reverse direction pulse signal.

In this embodiment, because the AND gate 104 outputs a pulse signal when an encoder pulse signal EP-A is falling and the AND gate 105 outputs a pulse signal when an encoder pulse signal EP-A is rising in addition to two forward direction pulse signals for one encoder pulse signal EP-B, four forward direction pulse signals are output upon the forward movement of the film 15. Similarly, because the AND gate 106 outputs a pulse signal when an encoder pulse signal EP-A is falling and the AND gate 107 outputs a pulse signal when an encoder pulse signal EP-A is rising in addition to two forward direction pulse signals for one encoder pulse signal EP-B, four forward direction pulse signals are output upon the reverse movement of the film 15.

Figure 14:
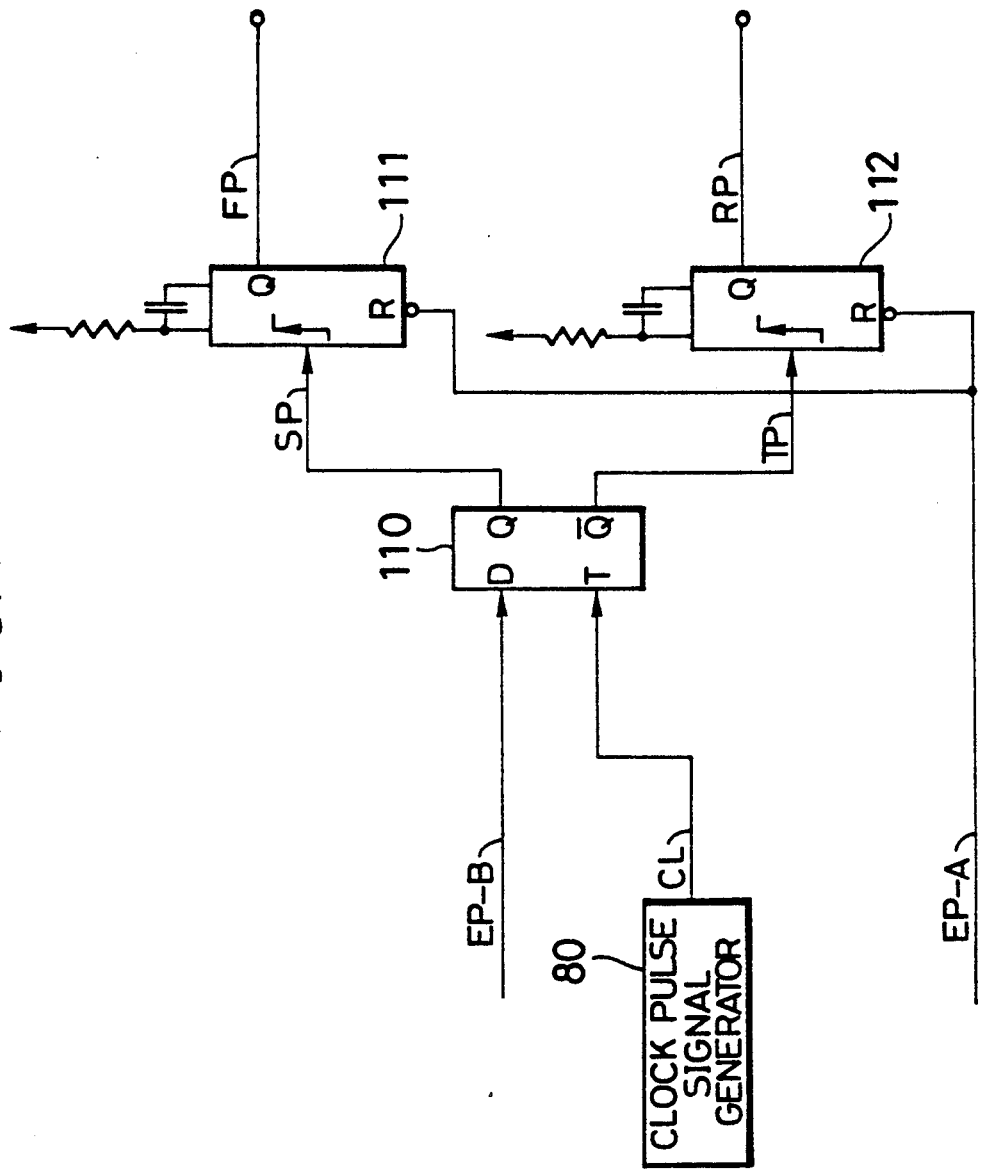
FIG. 14 is a diagram showing a variation of the circuit of FIG. 10 in which monostable multivibrators are used.

It is possible to replace the AND gates with monostable multivibrators 111 and 112. As shown in FIG. 14, a D-type flip-flop 110 receives an encoder pulse signal EP-B at its D-terminal and a clock pulse signal CL from the clock pulse generator 80 at its T-terminal. The D-type flip-flop 110 latches the encoder pulse signal EP-B at a timing of the clock pulse signal CL. A monostable multivibrator 111, which receives a pulse signal SP output from the Q-terminal of the D-type flip-flop 110, outputs a forward direction pulse signal FP at every rising of the input pulse signal SP). The monostable multivibrator 111 also receives an encoder pulse signal EP-A at its reset terminal R. When the encoder pulse signal EP-A is at a low level (L), the monostable multivibrator 111 is prevented from outputting a forward direction pulse signal FP.

Another monostable multivibrator 112, which receives a pulse signal TP output from the Q̄-terminal of the D-type flip-flop 110, outputs a reverse direction pulse signal RP at every rising of the input pulse signal TP. The monostable multivibrator 112 also receives an encoder pulse signal EP-A at its reset terminal R. When the encoder pulse signal EP-A is at a low level (L), the monostable multivibrator 112 is prevented from outputting a reverse direction pulse signal RP.

The pulse widths of the forward direction pulse signal FP and the reverse direction pulse signal RP are determined depending upon the capacity and resistance of the monostable multivibrator 111 and the monostable multivibrator 112, respectively. The periods at which the monostable multivibrators 111 and 112 output pulse signals are shorter than that of the clock pulse signal so that the forward direction pulse signal FP and the reverse direction pulse signal RP do not overlap.

Figure 15:
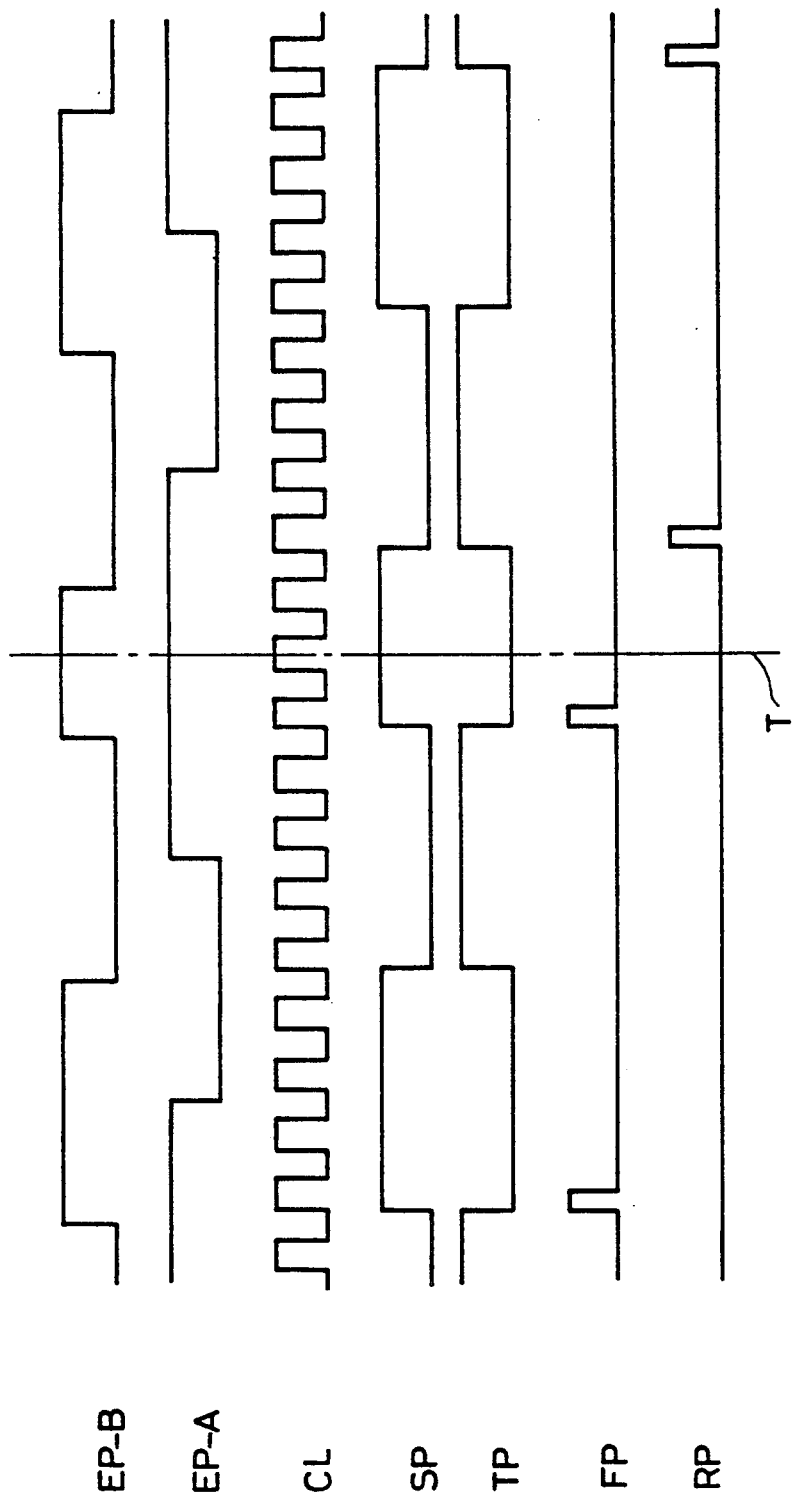
FIG. 15 is a timing chart showing various signals used in the circuit of FIG. 14.

Referring now to FIG. 15, illustrating a timing chart of various signals and pulse signals provided in the direction discriminator 82 shown in FIG. 14, the film 15 moves in the forward direction to the left of the line T and in the reverse direction to the right of the line T.

During the forward rotation of the rotary encoder 18, when an encoder pulse signal EP-B rises, the leading edge of a clock pulse signal CL causes the D-type flip-flop 110 to change the output signal SP from its Q-terminal to a high level (H) from a low level (L). Because the encoder pulse signal EP-A, which is fed to the reset terminal R of the monostable multivibrator 111, is at a high level (H), the monostable multivibrator 111 outputs a certain width of forward direction pulse signal FP due to the change of the pulse signal SP output from the Q-terminal of the D-type flip-flop 110 to a high level (H) from a low level (L).

On the other hand, during the reverse rotation of the rotary encoder 18, when an encoder pulse signal EP-B falls, the leading edge of a clock pulse signal CL causes the D-type flip-flop 110 to change the output signal TP from its Q̄-terminal to a high level (H) from a low level (L). Because the encoder pulse signal EP-A, which is fed to the reset terminal R of the monostable multivibrator 112, is at a high level (H), the monostable multivibrator 112 outputs a certain width of reverse direction pulse signal RP due to the change of the pulse signal TP output from the Q-terminal of the D-type flip-flop 111 to a high level (H) from a low level (L).

Figure 16:
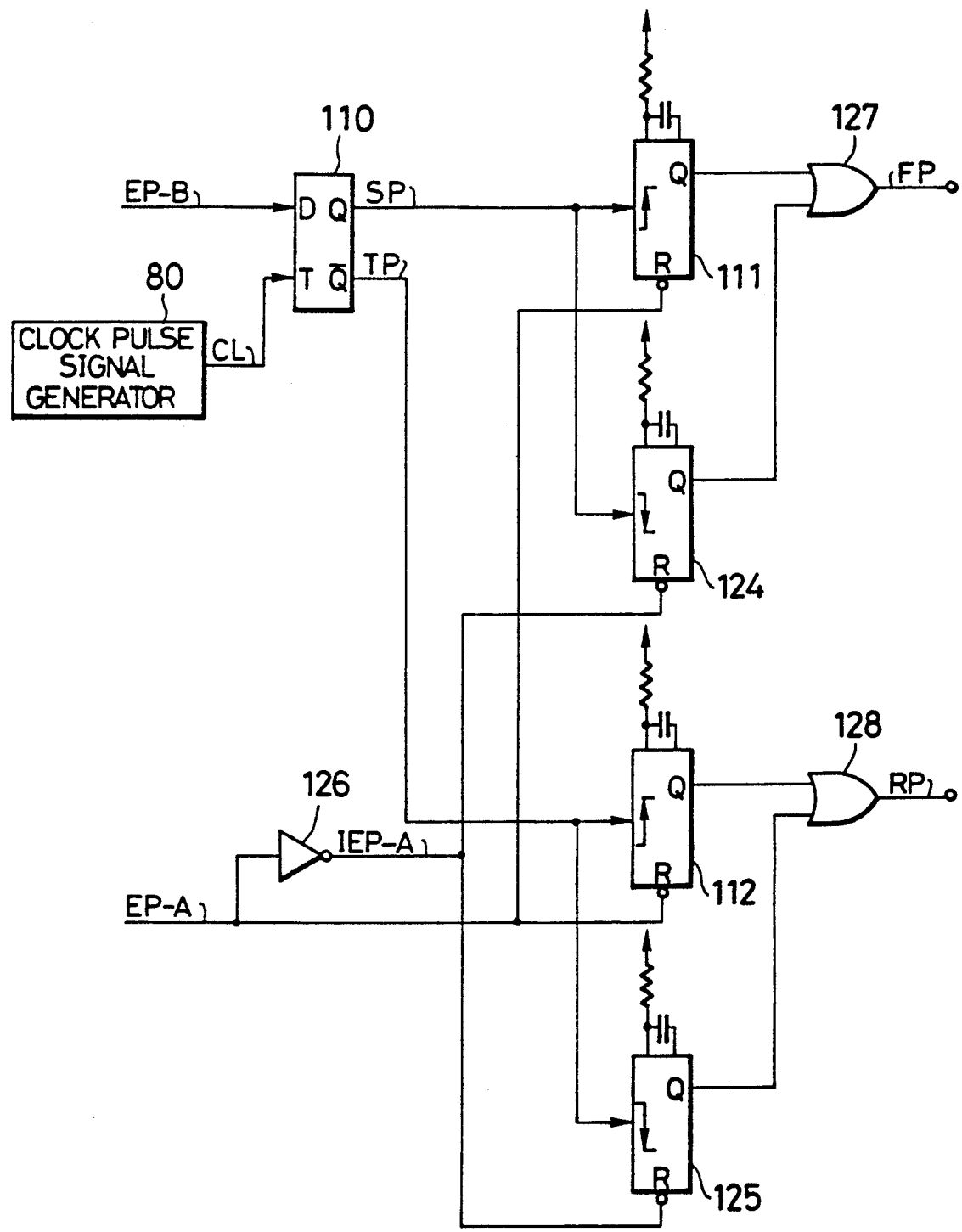
FIGS. 16 and 17 are diagrams showing variations of the circuit of FIG. 14.

FIG. 16 illustrates a variation of the direction discriminator 82 shown in FIG. 14, in which two pulse signals are provided for a period of encoder pulse signal and monostable multivibrators 124 and 125, an inverter 126 and OR gates 127 and 128 are added to the circuit of FIG. 14.

The inverter 126 acts to invert the polarity of encoder pulse signal EP-A in the A phase. The inverted polarity of encoder pulse signal IEP-A is fed to both reset terminals R of the monostable multivibrators 124 and 125. The monostable multivibrator 124 receives a pulse signal SP from the Q-terminal of the D-type flip-flop 110 and outputs at its Q-terminal a pulse signal when the pulse signal SP is falling. The OR gate 127, which receives outputs from the Q-terminals of the monostable multivibrator 111 and 124, transmits one of the outputs as a forward direction pulse signal FP therefrom when it receives either one of the outputs. The monostable multivibrator 124 outputs a pulse signal when encoder pulse signal EP-B is falling as the film moves in the forward direction and the monostable multivibrator 125 outputs a pulse signal when encoder pulse signal EP-B is rising as the film moves in the reverse direction.

Figure 17:
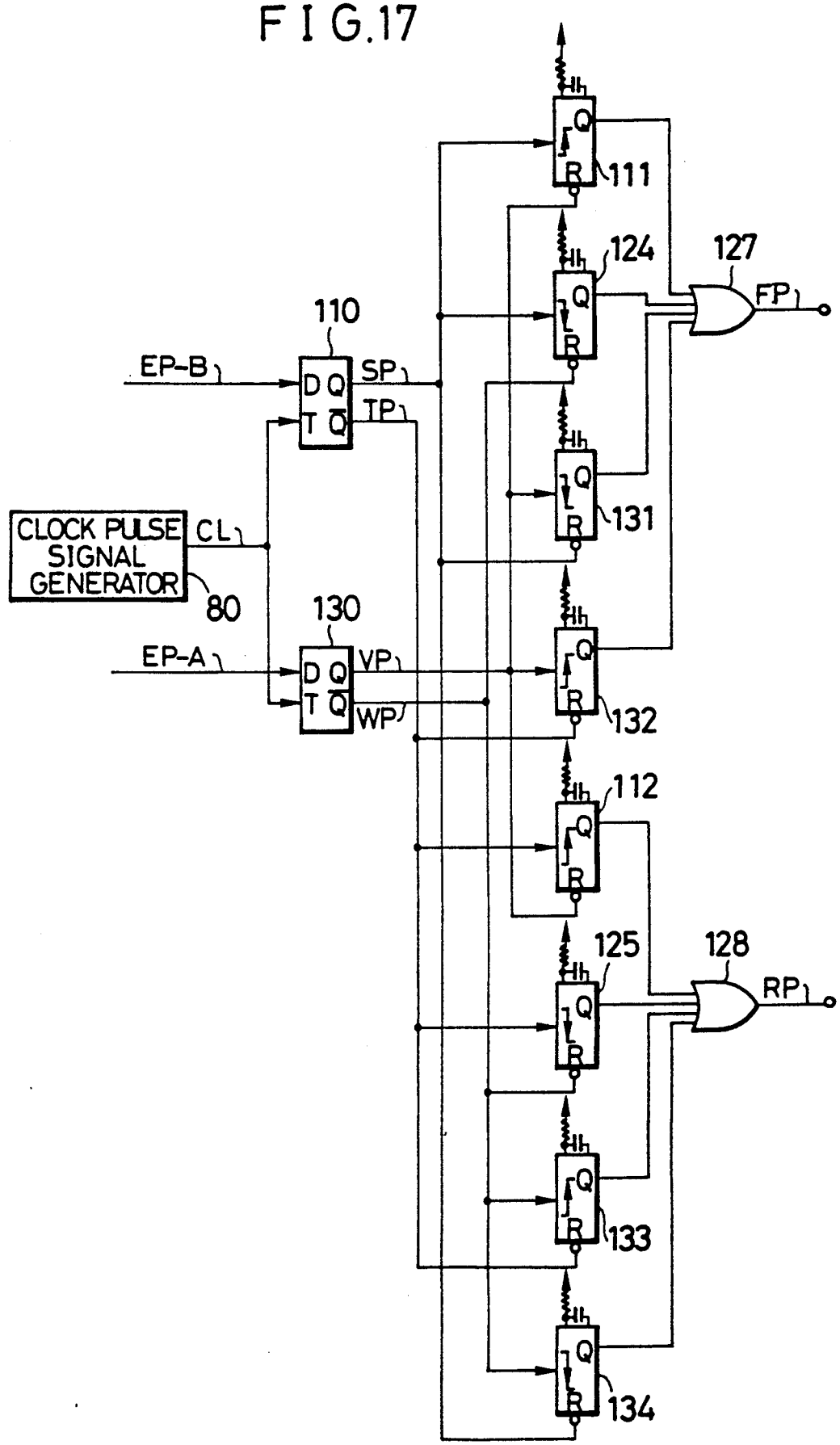

FIG. 17 illustrates a variation of the direction discriminator 82 shown in FIG. 16, in which a D-type flip-flop 130 and monostable multivibrators 131, 132, 133 and 134 are added to the circuit of FIG. 16. The D-type flip-flop 130 receives an encoder pulse signal EP-A at its D-terminal and a clock pulse signal CL from the clock pulse generator 80 at its T-terminal. The D-type flip-flop 130 latches the encoder pulse signal EP-A at a timing of the clock pulse signal CL. The monostable multivibrator 131, which receives a pulse signal VP output from the Q-terminal of the D-type flip-flop 130 as a trigger input, outputs a pulse signal at the falling of the input pulse signal VP. This monostable multivibrator 131, which receives a pulse signal SP output from the Q-terminal of the D-type flip-flop 130 at its reset terminal R, is prevented from outputting a pulse signal at its Q-terminal when the input pulse signal SP is at a low level (L).

The monostable multivibrator 132, which receives a pulse signal VP output from the Q-terminal of the D-type flip-flop 130 as a trigger input, outputs a pulse signal at the rising of the input pulse signal VP. This monostable multivibrator 132, which receives a pulse signal TP output from the Q̄-terminal of the D-type flip-flop 110 at its reset terminal R, is prevented from outputting a pulse signal at its Q-terminal when the input pulse signal TP is at a low level (L).

The monostable multivibrator 133, which receives a pulse signal WP output from the Q̄-terminal of the D-type flip-flop 130 as a trigger input, outputs a pulse signal at the rising of the input pulse signal WP. This monostable multivibrator 133, which receives a pulse signal TP output from the Q̄-terminal of the D-type flip-flop 110 at its reset terminal R, is prevented from outputting a pulse signal at its Q-terminal when the input pulse signal TP is at a low level (L).

The monostable multivibrator 134, which receives a pulse signal WP output from the Q̄-terminal of the D-type flip-flop 130 as a trigger input, outputs a pulse signal at the falling of the input pulse signal WP. This monostable multivibrator 134, which receives a pulse signal SP output from the Q-terminal of the D-type flip-flop 110 at its reset terminal R, is prevented from outputting a pulse signal at its Q-terminal when the input pulse signal SP is at a low level (L).

The OR gate 127, which is connected to output pulse signals from the Q-terminals of the four monostable multivibrators 111, 124, 131 and 132, outputs a forward direction pulse signal FP when it receives at least one output pulse signal. Similarly, the OR gate 128, which is connected to output pulse signals from the Q-terminals of the four monostable multivibrators 112, 125, 133 and 134, outputs a reverse direction pulse signal RP when it receives at least one output pulse signal.

The monostable multivibrator 131 outputs a pulse signal when an encoder pulse signal EP-A is falling and the monostable multivibrator 132 outputs a pulse signal when the encoder pulse signal EP-A is rising as the film moves in the forward direction. The monostable multivibrator 133 outputs a pulse signal when an encoder pulse signal EP-A is falling, and the monostable multivibrator 234 outputs a pulse signal when the encoder pulse signal EP-A is rising as the film moves in the reverse direction. Thus, four forward or reverse direction pulse signals are provided for each period of encoder pulse signal.

Figure 18:
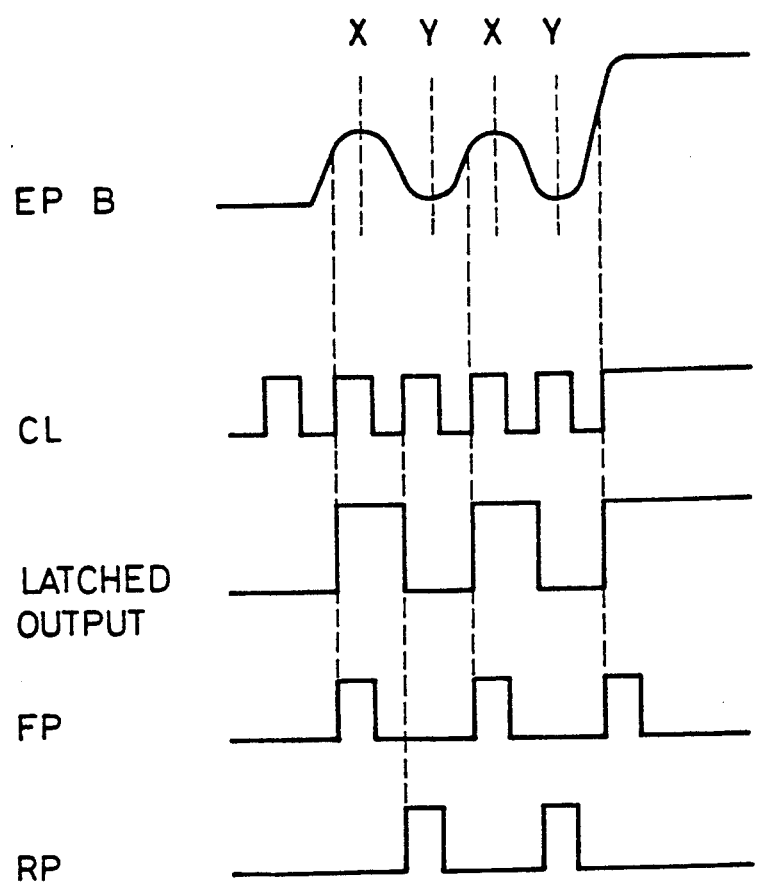
FIG. 18 is a timing chart for explaining the reversed film correcting function.

In all of the embodiments described above, because an encoder pulse signal is latched by a clock pulse signal generated at a high frequency, if the film is subjected to oscillations in both directions of movement, the direction of movement of the film is restrictively determined to be either forward or reverse between at least two consecutive clock pulse signals. The circuit for discriminating the direction of movement of the film is adapted to provide only one forward or reverse direction pulse signal between two consecutive clock pulse signals, so as reliably to prevent the overlap of forward and reverse direction pulse signals. This aspect of the invention is illustrated by the timing chart of FIG. 18.

The D-type flip-flop used as a latch means in the above embodiments may be replaced by a JK-type flip-flop. Furthermore, the delay circuit in the above embodiments may take the form of a cascade connection of two monostable multivibrators.

As described above, by accurately detecting the reverse movement of the film and effecting a correction of movement of the film, bar codes can be side printed on the film at precise locations and no double exposures are permitted to occur. However, it is essential for side printing bar codes on the film at precise locations that the rotary encoder works precisely, in addition to controlling accurately the movement of the film. For example, if the rotary encoder 18 is unable to provide a signal due to a breakdown of the rotary encoder itself or elements of the signal transfer line, a poor contact of connectors, a mechanical failure in attaching the rotary encoder 18 such as a loose connection, or mechanical stress accumulated in the rotary encoder 18, it is judged that the film 15 has stopped and accordingly, printing is interrupted. If the film is forwarded while the rotary encoder 18 produces no signal, nothing is printed on the film 18. This leads to printing incorrect patterns on the film 18 at improper locations, resulting in production of substandard film.

Figure 19:
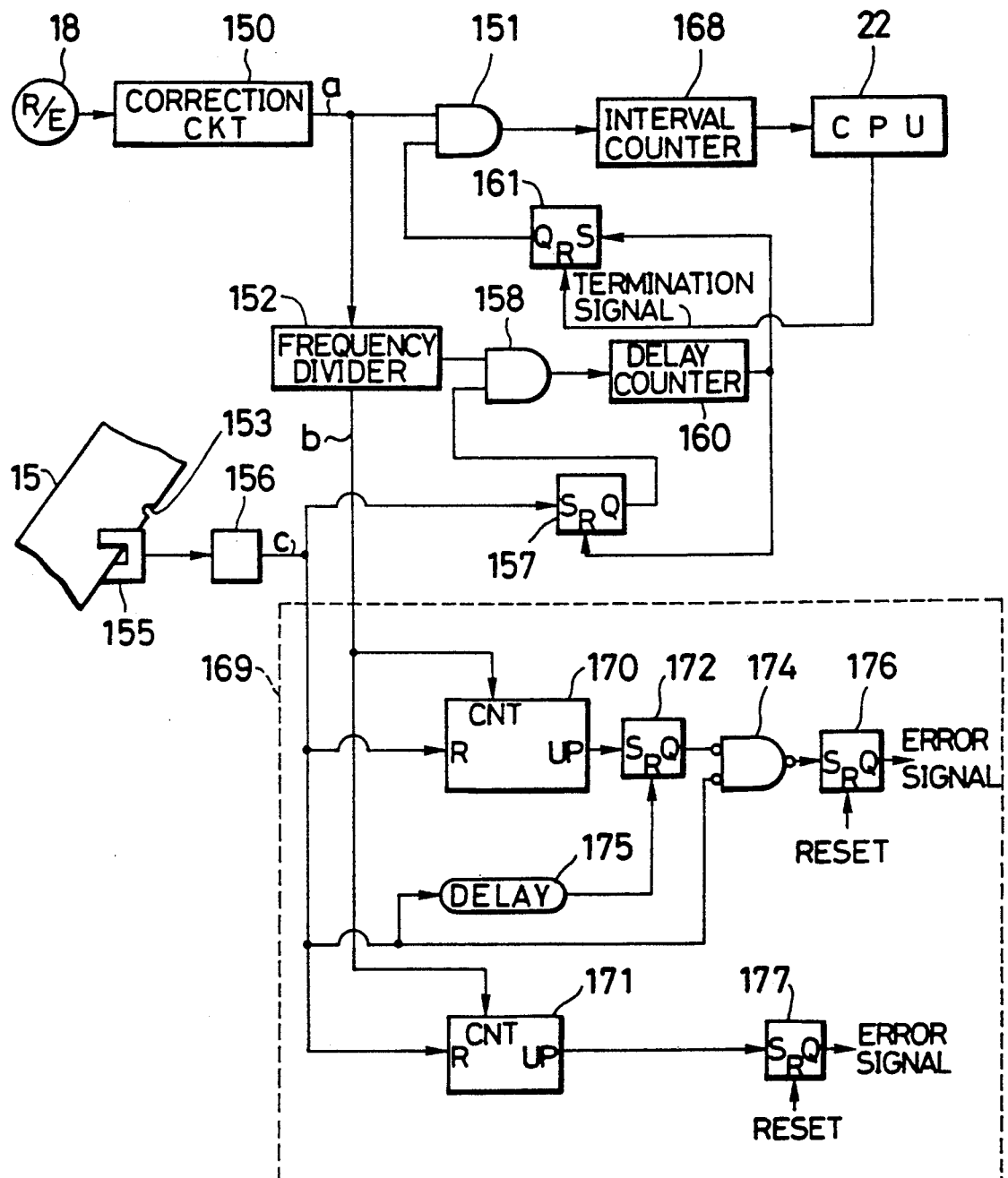
FIG. 19 is a diagram showing a failure detecting circuit for detecting operational failures of a rotary encoder.

In view of the above, to monitor the operation of the rotary encoder 18, a rotary encoder monitoring circuit such as that shown in FIG. 19 is incorporated in the side printer. As shown, the rotary encoder 18 outputs film-transporting signals in two different phases which in turn are transmitted to a correction circuit 150 for correcting a reversed movement of the film 15. The correction circuit 150 is adapted to produce a series of transportation pulse signals a the number of which is proportional to the length of the film 15 transported in the forward direction. The series of transportation signals a are sent, on one hand, to an AND gate 151 and, on the other hand, to a frequency divider 152. The frequency divider 152 divides the series of transportation pulse signals at an appropriate dividing ratio and sends them as monitoring pulse signals b to an operational failure detecting circuit 169 which will be described in detail later. It is to be noted that the length of the film transported for the period of a monitoring pulse signal b is longer than that for the period of a transportation pulse signal a.

The film 15 fed to the side printer, as was previously described with reference to FIG. 1, has notches 153, one every length corresponding to one roll of film. The notch 153 is detected by a photosensor 155 incorporated in the side printer at an appropriate location. The photosensor 155 outputs a signal upon detection of the notch 153 and sends it to a differential circuit 156. The differential circuit 156 produces a synchronizing pulse signal c upon detecting the leading edge or the trailing edge of the notch signal. For a synchronizing pulse signal, which is used in the side printer to detect the leading or the trailing ends of rolls of film to which the film 15 is cut, various signals may be available, such as a cutting signal produced upon cutting the film to a roll of film by the cutter 30 (see FIG. 3), a signal produced by an optical or a mechanical contact sensor attached to a drive shaft of the cutter 30 every time the cutter 30 cuts the film to a roll of film product or an actuation pulse signal applied to a notch former for forming notches 153 in the film 15, other than the signal provided by the photosensor 155, because any signal is suitable, so long as it is produced for each length corresponding to a roll of film.

The synchronizing signal c is sent to a latch circuit 157 comprising, for example, an RS-type flip-flop. The RS-type flip-flop 157 is set upon receiving the synchronizing signal c and outputs a high level (H) signal at its Q-terminal which in turn is fed to an AND gate 158 so as to open it.

The delay counter 160 connected to the AND gate 158 has a preset count value equal to the number of divided pulse signals b to be produced corresponding to a length of film by which the film 15 is transported between the generation of a synchronizing pulse signal c and the start of printing. This counter 160 outputs a low level (L) signal upon counting the same number of divided pulse signals c as its preset count value. This low level signal (L) is sent, on the one hand, to the reset terminal of the latch circuit 157 and, on the other hand, to the S terminal of the latch circuit 161 to reset it.

Upon resetting the latch circuit 161 with the low level signal (L) from the delay counter 160, the latch circuit 161 outputs a high level (H) signal at its Q-terminal so as to open the AND gate 151, causing an interval counter 168 to count the transportation pulse signal a from the correction circuit 150. The interval counter 168 outputs to CPU 22 a print timing signal every time it counts up a predetermined number of the transportation pulse signals a. With the print timing signal, the CPU 22 controls the exposure apparatus 24 so as to print characters and a bar code on the film at a predetermined location. When printing is completed for a roll of film in this way, the CPU 22 outputs a print termination signal to the latch circuit 161 to reset it, thereby closing the AND gate 151 and resetting the interval counter 168.

The operational failure detecting circuit 169 includes operational failure detecting counters 170 and 171 for detecting operational failures and asynchronisms of the rotary encoder 18, respectively, to which divided pulse signals b are fed. The operational failure detecting counter 170, which is initially set to a value equal to the number of divided pulse signals b corresponding to a length slightly shorter than that of a roll of film, changes the initial preset value by one decrement every divided pulse signal b. Upon counting down to zero (0), the failure detecting counter 170 outputs a low level signal (L) at its UP terminal to a latch circuit 172. The failure detecting counter 170, upon receiving a synchronizing signal from the differential circuit 156 at its reset terminal R, resets itself to the initial preset value.

When the latch circuit 172 is set, an OR gate 174 is caused to close so as to shut off the synchronizing signals c provided thereafter. The synchronizing signal, after being delayed by a delay circuit 175, resets the latch circuit 172. On the other hand, if a synchronizing signal c is generated before the low level signal (L) is output from the UP-terminal of the failure detecting counter 170, it sets a latch circuit 176 and causes it to output an operational failure signal at its Q-terminal, indicating an operational failure of the rotary encoder (R/E).

The asynchronism detecting counter 171, which is initially set to a value equal to the number of divided pulse signals b corresponding to a length slightly longer than that of a roll of film, changes the initial preset value by one decrement every divided pulse signal b. Upon counting down to zero (0), the asynchronism detecting counter 171 outputs a low level signal (L) at its UP terminal to set a latch circuit 177. Upon setting the latch circuit 177, the latch circuit 177 outputs a high level signal (H) as an asynchronism signal.

In operation of the rotary encoder monitoring circuit shown in FIG. 19, when the photosensor 155 detects one of the notches 153 formed in the film 15 at regular spacings corresponding to the length of a roll of film, the differential circuit 156 outputs a synchronizing signal c to set the latch circuit 157 and set the failure detecting counter 170 and the asynchronism detecting counter 171 to their initial values, respectively. Upon setting the latch circuit 157, the AND gate 158 opens to transmit divided pulse signals b from the frequency divider 152 to the delay counter 160. The film is continuously transported even after the synchronizing signal c is output, and divided pulse signals b provided corresponding to the length of transported film 15 are counted up by the delay counter 160 up to a predetermined count value. When the film 15 is properly located so as to place a part thereof to be printed in the exposure position, the count of the delay counter 160 will reach the predetermined count value and output a low level signal (L) to set the latch circuit 161, as well as to reset the latch circuit 157 and close the AND gate 158.

As a result of setting the latch circuit 161, the AND gate 151 opens to feed transportation pulse signals a to the interval counter 168. The interval counter 168, upon counting a predetermined number of the transportation pulse signals a, outputs a print timing signal to the CPU 22 so as to cause the exposure apparatus 24 to print characters on the film 15. This ongoing printing operation of the side printer is repeated upon each detect of a notch 153 by the photosensor 155.

As long as the side printer repeats the ongoing printing operation, due to detection by the photosensor 155 of a notch 153 at a timing after the failure detecting counter 170 has counted down a number of divided pulse signals b from its initial count value to zero and outputs a low level signal (L) at the UP-terminal, the OR gate 174 is maintained closed so as continuously to disable the latch circuit 176 and prevent output of an operational failure signal even though another synchronizing signal c is provided from the differential circuit 156.

The asynchronism detecting counter 171, because it receives another synchronizing signal c at its reset terminal before counting down a number of divided pulse signals b from its initial count value to zero, outputs no low level signal (L) at its UP-terminal, so that the latch circuit 177 is maintained disabled.

If an abnormal or failure operation is caused in the rotary encoder 18 and/or in the correction circuit 150 due to disturbances or other obstructions, and the transportation pulse signals a are thereby partly or entirely interrupted, then the divided pulse signals b will be reduced in number. At the time the photosensor 155 detects another notch 153 and another synchronizing pulse signal c is provided, vided, the failure detecting counter 170 outputs no low level signal (L) and the OR gate 174 will thus be open. Accordingly, the further synchronizing pulse signal c sets the latch circuit 176 through the OR gate 174 so as to provide an operational failure signal.

The asynchronism detection counter 171 usually counts down a number of divided pulse signals b from its initial count value, and is set by a synchronizing signal c and reset by another synchronizing signal c before counting down to zero (0). However, if the photosensor 155 outputs no synchronizing signal c due to some disorder, the asynchronism detection counter 171 is not reset and effects latching of the latching circuit 177, thereby providing an asynchronizing signal.

In this embodiment, because synchronizing signals are used as timing signals for asynchronism detection, the detection of abnormal generation of the synchronizing signals enables reliable detection of the failure of operation of the rotary encoder 18. Furthermore, it is not possible to forward the film without effecting an intended printing due to the lack of a printing signal. It is to be noted that the frequency divider 152 and the differential circuit 156 may not be always provided. Absence of the frequency divider 152 affects the number of count value digits of the operational failure detecting counter 170 and the asynchronizing detecting counter 171. If the delay counter is omitted 160, then the AND gate 158 and the latch circuit 161 should also be omitted. In this case, an output from the Q-terminal of the latch circuit 157 is fed to one of the input terminals of the AND gate 151 and a print termination signal from the CPU 22 is fed to the reset terminal of the latch circuit 157.

Figure 20:
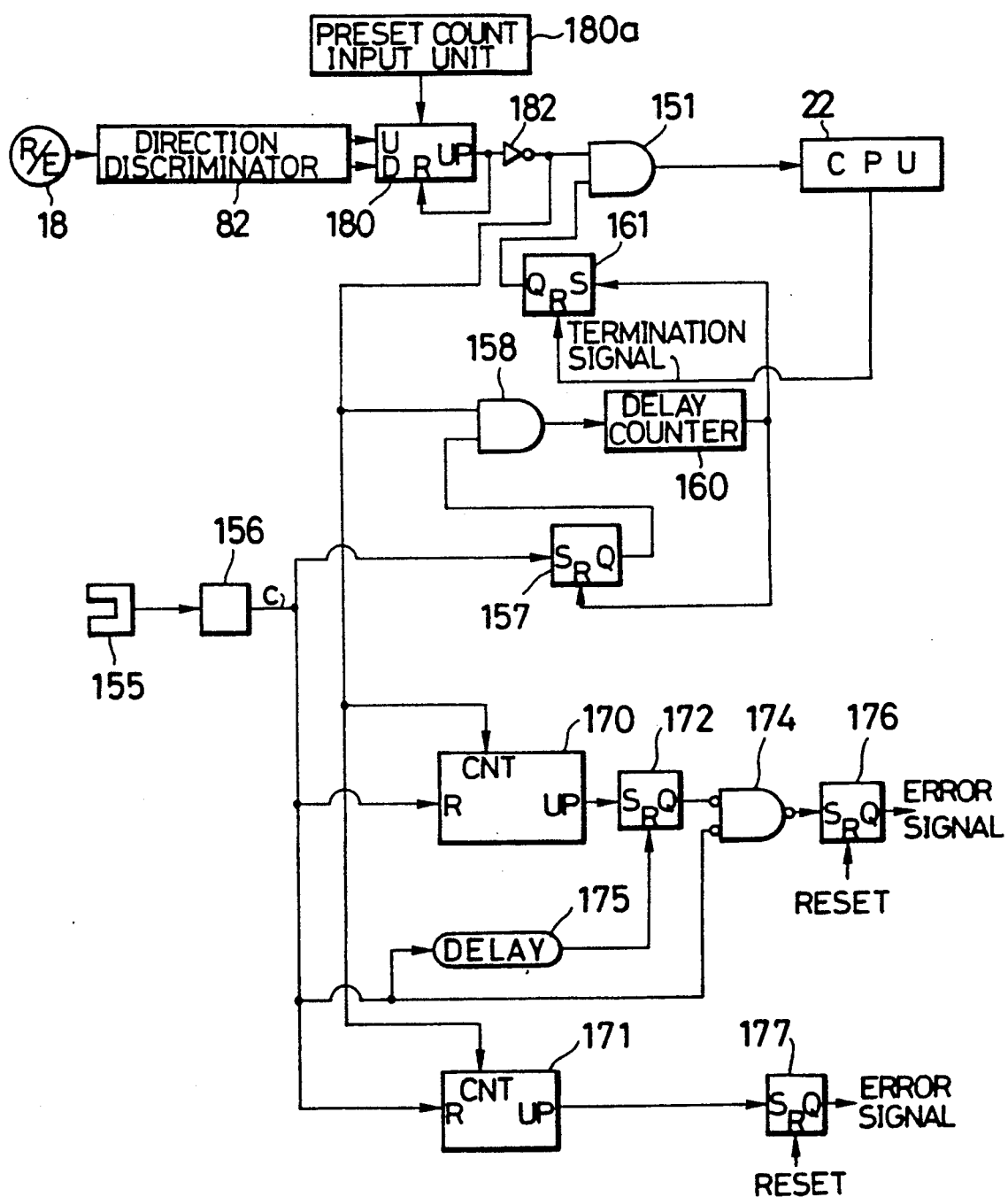
FIG. 20 is a diagram showing a variation of the failure detecting circuit of FIG. 19.

FIG. 20 shows a variation of the rotary encoder monitoring circuit shown in FIG. 19, which is almost identical in structure to the operation monitoring circuit shown in FIG. 19 except for the manner of the processing transportation signals from the encoder 18. An interval counter 180, whose initial count value is set by means of a preset count input unit 180a and which receives the transportation signals from the encoder 18 via the direction discriminator 82, has up and down counter terminals to count up forward transportation signals or count down reverse transportation signals. The interval counter 180 outputs a low level signal (L) and resets its count value to zero (0) every time it has counted up the same number of forward transportation signals as its preset count value. Accordingly, the interval counter 180 outputs low level signals (L) as divided transportation pulse signals, one for each number of transportation pulse signals equalling its preset count value, to the failure detection counter 170 and the asynchronism detecting counter 171.

A low level signal (L) thus output from the UP-terminal of the interval counter 180 is inverted by inverter 182 to a high level signal (H) and transmitted as a print timing signal to the CPU 22 only when the AND gate 151 is open, thereby to start printing. In this embodiment, it is also to be noted that the delay counter 160 is not always in the same interval as in the previous embodiment.

Figure 21:
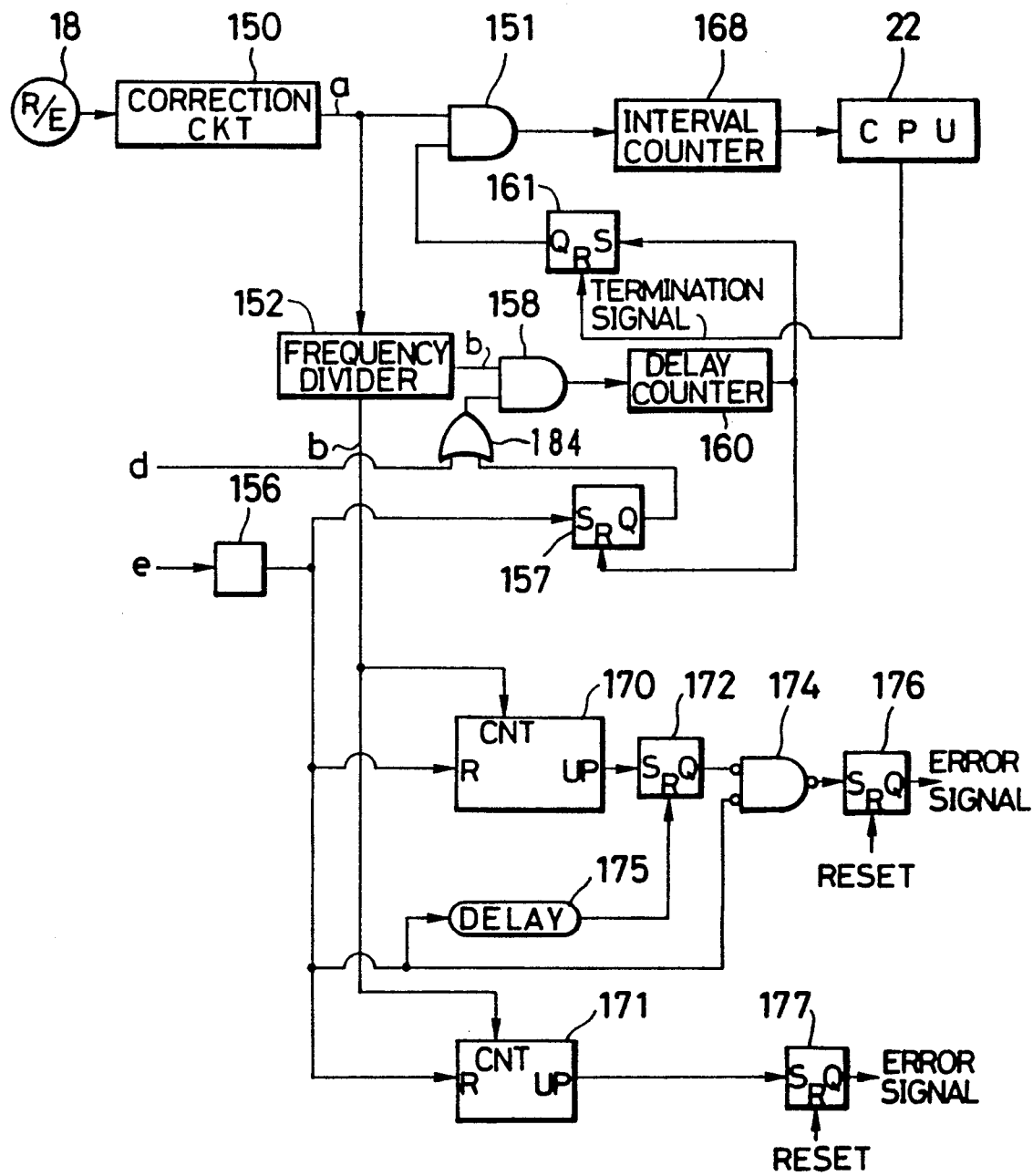
FIG. 21 is a diagram showing another variation of the failure detecting circuit of FIG. 19.

FIG. 21 shows another variation of the rotary encoder monitoring circuit shown in FIG. 19. In this monitoring circuit, the photosensor 155 in the monitoring circuit shown in FIG. 19 is removed. However, a check signal e is input by means of an external input unit. Such a check signal e is periodically input for a predetermined length of transported film, and a signal provided every one rotation of the measuring roller 16 or a check timing signal provided from the CPU 22 may be used. A check signal e is differentiated by the differential circuit 156. The differentiated pulse signal resets the failure detecting counter 170 and the asynchronism detecting circuit 171 as well as the latch circuit 157. Following the resetting of the counters 170 and 171 and the latch circuit 157, the same procedures as in the rotary encoder monitoring circuit shown in FIG. 19 are basically followed, except for the use of the differentiated pulse signal for the synchronizing pulse signal c.

The AND gate 158, which controls the transmission of divided pulse signals b from the frequency dividing circuit 152, is connected with an OR gate 184 connected to the Q-terminal of the latch circuit 157 and an input terminal d. A delay counter 160 for counting the divided pulse signals b transmitted through the AND gate 158 takes the form of a rate generator which outputs a low level pulse signal (L) every predetermined number of divided pulse signals b (for example the number of divided pulse signals b corresponding to a roll of film).

By applying a high level signal (H) at the input terminal so as to keep the AND gate 158 open, divided pulse signals b being continuously transmitted to the delay counter 160 which is in effect a rate generator, a triggering signal for starting printing is obtained every time a predetermined number of divided pulse signals b are output. That is, a print synchronizing signal is generated not from an external unit, but internally. By using the check signal e input on a certain period, it is possible to detect a failure of the rotary encoder 18 within this period. The accuracy of detecting errors of the rotary encoder 18 of course depends upon the selected period of check signal e. The failure detecting counter 171 monitors the period on which differential pulse signals are generated based on the divided pulse signals b, which corresponds to the monitoring of synchronizing pulse signals c in the rotary encoder monitoring circuit shown in FIG. 19.

If the rotary encoder monitoring circuit is used with a low level signal (L) maintained applied at the input terminal d, the delay counter 160 acts in the same manner as in the rotary encoder monitoring circuit shown in FIG. 19. In this case, printing is effected at a timing of the application of signal at the input terminal e. That is, the input terminal d is used to select whether a synchronizing signal for printing should be provided externally or internally.

As described above, in this embodiment (which is especially useful for manufacturing a number of rolls of film from a long rough film having no notches), although no synchronizing signal c is provided every predetermined length of movement of the film, the use of the delay counter 160 as a rate generator in which an initial count is previously set to the number of divided pulse signals b corresponding to the predetermined length of a roll of film performs the same printing function as that shown in FIG. 19. For a side printer operating in such a manner, by inputting check signals to the input terminal at appropriate intervals, failures occurring in the rotary encoder 18 can be detected.

Figure 22:
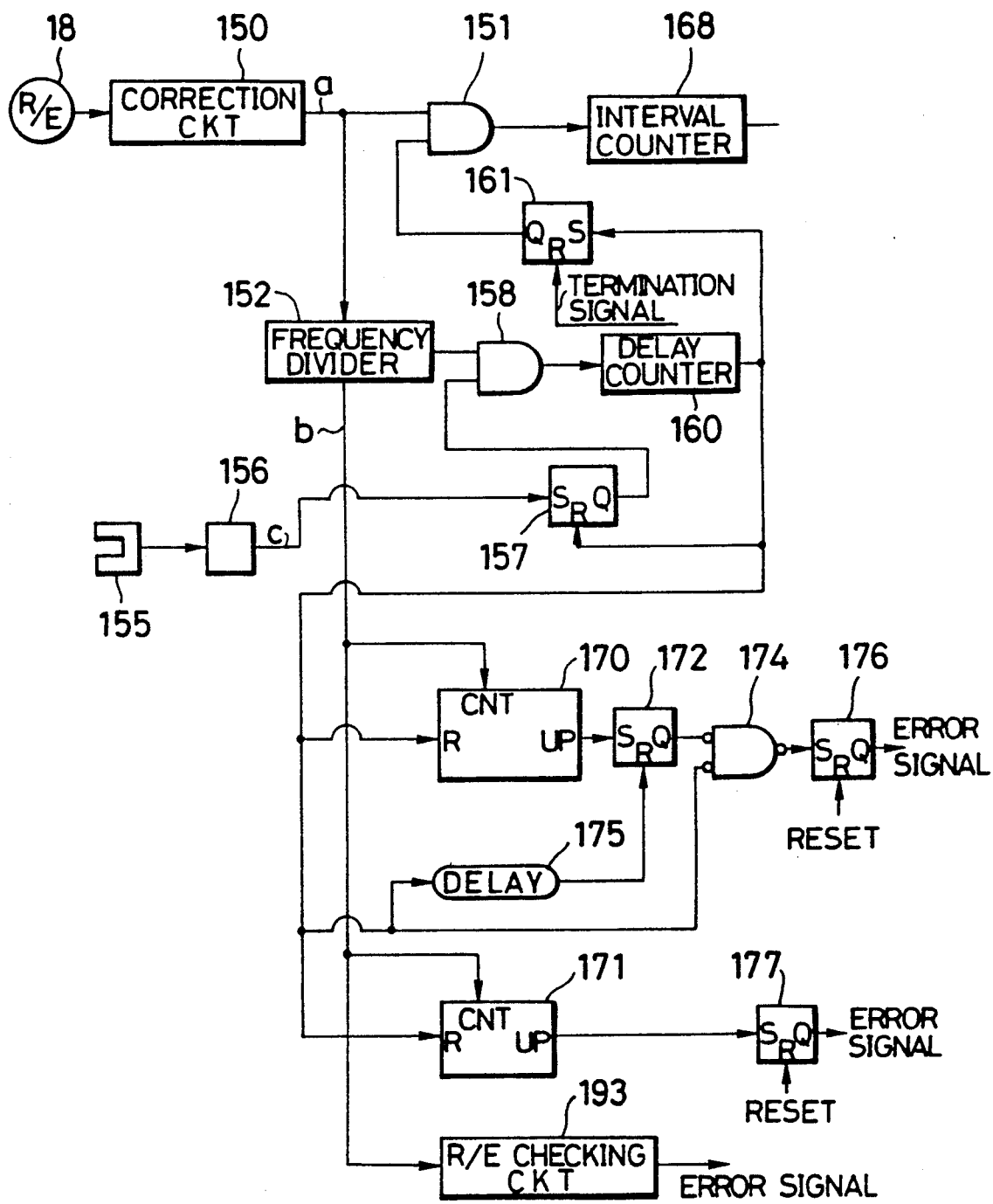
FIG. 22 is a diagram showing yet another variation of the failure detecting circuit of FIG. 19.

FIG. 22 shows still another variation of the rotary encoder monitoring circuit shown in FIG. 19. In this monitoring circuit, a signal output from delay counter 160, rather than a synchronizing signal c, is used as a signal for resetting failure detecting counter 170 and asynchronism detecting counter 171. Accordingly, the failure detecting counter 170 is reset by a signal from the delay counter 160 and checks whether the rotary encoder 18 provides an appropriate number of pulse signals.

If pulse signals from the rotary encoder are not obtained at all, the delay counter 160 does not output any signal and therefore, it becomes impossible to detect a failure caused in the rotary encoder 18. For this reason, a rotary encoder checking circuit 193, which receives divided pulse signals b from the frequency dividing circuit 152, is provided to detect the interruption of pulse signals from the rotary encoder 18. The rotary encoder checking circuit 193 is structured, for example, to provide a film transportation error signal when a high (H) or a low (L) level of divided pulse signal b is successively output N times. The level of divided pulse signal b is sampled every predetermined period by being directly retrieved into I/0 by a microcomputer.

Figure 23A:
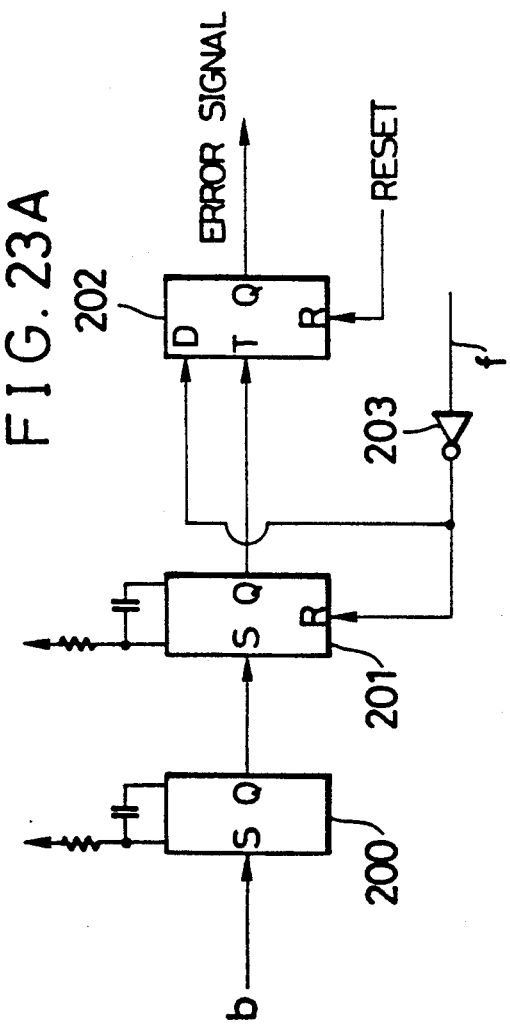
FIGS. 23(A) and (B) are diagrams showing checking circuits used in the failure detecting circuit of FIG. 20.

For the rotary encoder checking circuit 193, a circuit such as that shown in FIG. 23(A) may be used. As shown, divided pulse signals b provided as the film is transported are fed to a triggerable monostable multivibrator 200 whose holding time is set longer than that period on which divided pulse signal b is ordinarily provided. While divided pulse signals b are provided, the triggerable monostable multivibrator 200 maintains a high level signal (H) at its Q-terminal. A flip-flop 201 connected to the triggerable monostable multivibrator 200 detects the falling of a pulse signal input thereto, to output a high level signal (H) at its Q-terminal.

The output from the Q-terminal of the flip-flop circuit 201 is connected to the T-terminal of a D-type flip-flop 202. Fed to the D-terminal of the D-type flip-flop 20 via an inverter is a film transportation signal f which becomes low level (L) with a short time delay after the film starts and high level (H) slightly prior to stoppage of the film. According to the rotary encoder checking circuit 193, if divided pulse signals b are interrupted while the film transportation signal f is kept at high level (H), the flip-flop 201 outputs at its Q-terminal a high level signal (H) as a read-in timing signal to the D-type flip-flop 202. Upon receiving the read-in timing signal, the D-type flip-flop 202 latches an input signal to the D-terminal thereof. Because the D-terminal of the D-type flip-flop 202 receives a high level signal (H) inverted by an inverter 203, the D-type flip-flop circuit 202 outputs a high level signal (H) as a failure signal at its Q-terminal.

Figure 23B:
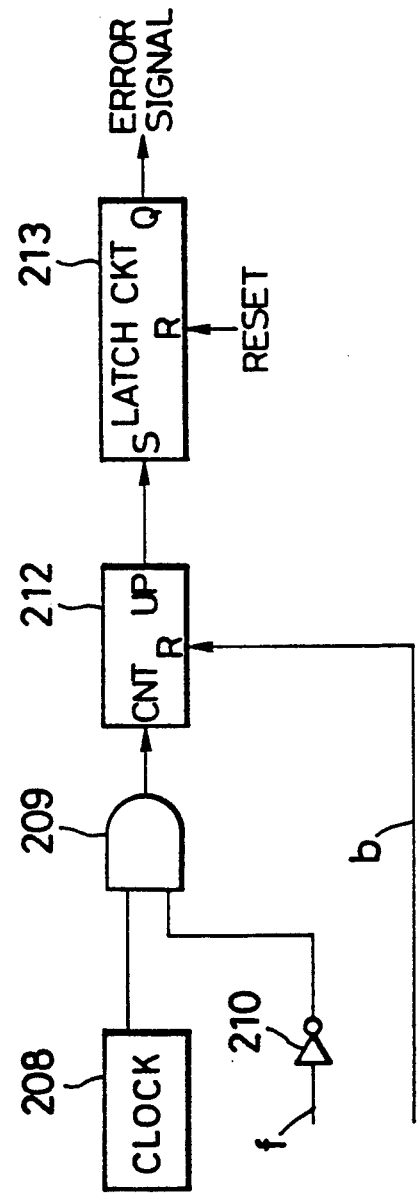

For the rotary encoder checking circuit 193, another circuit such as that shown in FIG. 23(B) may also be used. As shown, a clock pulse generator 208 provides a clock pulse signal which is fed to an AND gate 109. In a manner similar to the circuit shown in FIG. 23(A), the AND gate 209, which also receives a film transportation signal f, keeps itself open while the film is continuously transported to transit the clock pulse signal to a counter 212.

The initial count value of the counter 212 is preset to a value less than the number of pulse signals provided for a period on which a divided pulse signal b is output. Divided pulse signals b are fed to the reset terminal of the counter 212. After counting up to its preset value, the counter 212 outputs at its UP-terminal a low level signal (L) to a latch circuit 213 for resetting it.

According to the rotary encoder checking circuit 193 shown in FIG. 23(B), as long as divided pulse signals b are provided on periods within a predetermined range, the counter 212 is reset to zero (0) upon each reception of a divided signal b, so as not to set the latch circuit 213. If divided pulse signals b are interrupted, the counter 212 counts up clock pulse signals over its preset initial count value so as to set the latch circuit 213 to provide an error signal at the Q-terminal.

Figure 24:
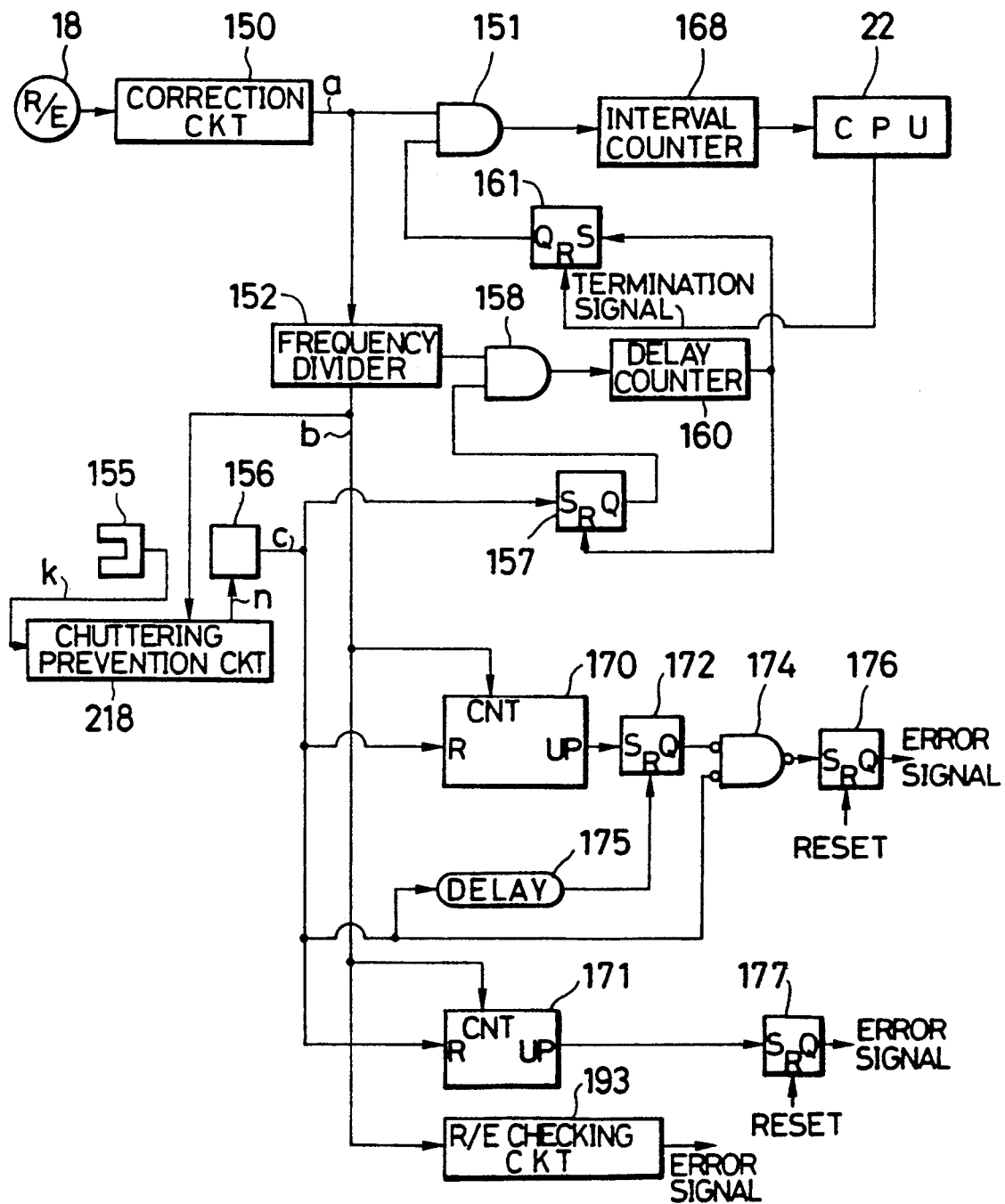
FIG. 24 is a diagram showing a further variation of the failure detecting circuit of FIG. 19.

FIG. 24 shows a further variation of the rotary encoder monitoring circuit shown in FIG. 19. In this monitoring circuit, a chattering prevention circuit 218 is connected after the photosensor 155 in the monitoring circuit shown in FIG. 19. When detecting notches 153 formed in the rough film 15 by the photosensor 155, it often happens that the photosensor 155 provides false signal due to flutters of the film or folded edges of the film which are superposed upon notch signals k. Such superposed signals, if transmitted to and differentiated by the differential circuit 156, result in false synchronizing pulse signals c. To avoid such a problem, the chattering prevention circuit 218 is an effective solution.

Figure 25A:
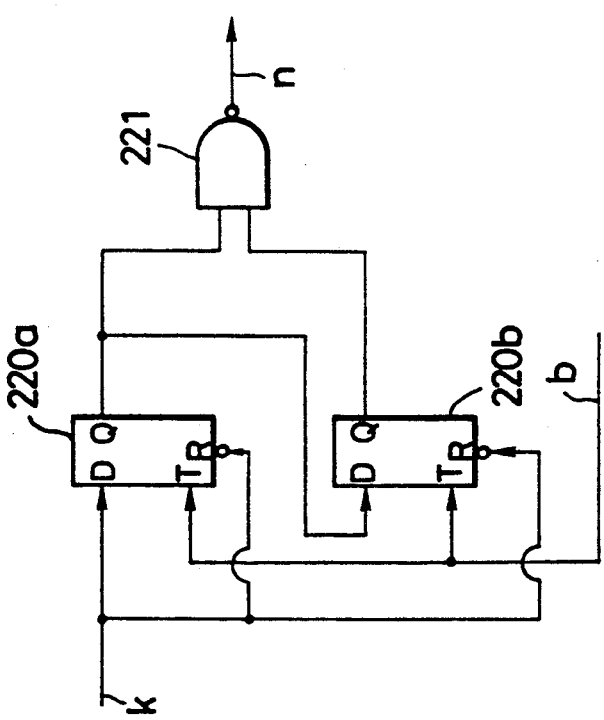
FIG. 25(A) is a diagram showing a chattering prevention circuit used in the circuit of FIG. 24.

The chattering prevention circuit 218 shown in FIG. 24 may be structured as shown in FIG. 25(A). As shown, the chattering prevention circuit 218 consists of two D-type flip-flops 220a and 220b and a NAND gate. A notch signal k from the photosensor 155 is fed to the D-terminal of the D-type flip-flop 220a and to the reset terminals of both of the D-type flip-flops 220a and 220b. The D-type flip-flop 220b is supplied at its D-terminal with the output from the Q-terminal of the D-type flip-flop 220a. Divided pulse signals b from the frequency divider 152 are fed to the T-terminals of the D-type flip-flops 220a and 220b. Both of the outputs from the Q-terminals of the D-type flip-flops 220a and 220b are fed to the NAND gate 221.

Figure 25B:
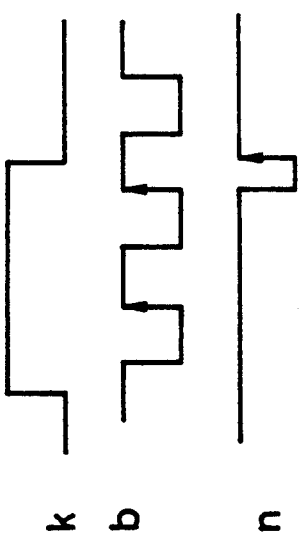
FIG. 25(B) is a timing chart of various signals used in the chattering prevention circuit of FIG. 25(A)

As shown in FIG. 25(B), the NAND gate 221 provides a signal n that falls when the D-type flip-flops 220a and 220b receive two divided pulse signals b, respectively, after the photosensor 155 detects a notch 153 and provides a notch signal k, and rises to a high level (H) upon the falling of the notch signal k to a low level (L). That is, unless the notch signal k is kept in a high level (H) for a time period within which at least two divided pulse signals b are fed to the D-type flip-flops 220a and 220b, the NAND gate 221 does not provide a pulse signal b. Accordingly, if notch signals k are intermittently provided at intervals shorter than the two cycles of divided pulse signal b, the interruption of notch signal k is neglected as being caused by chattering.

The NAND gate 221 sends the pulse signal n to the differential circuit 156 where the rising or trailing edge of the pulse signal n is detected and used as a synchronizing signal c. The number of the D-type flip-flops connected one after another should be determined considering the period of divided pulse signal b and the length of the notch 153 (the width of a notch signal k) and in accordance with the requirement of how many cyclic divided pulse signals b should be provided for a period of maintaining the notch signal k in a high level (H) after which a synchronizing pulse signal c should be provided.

Figure 26:
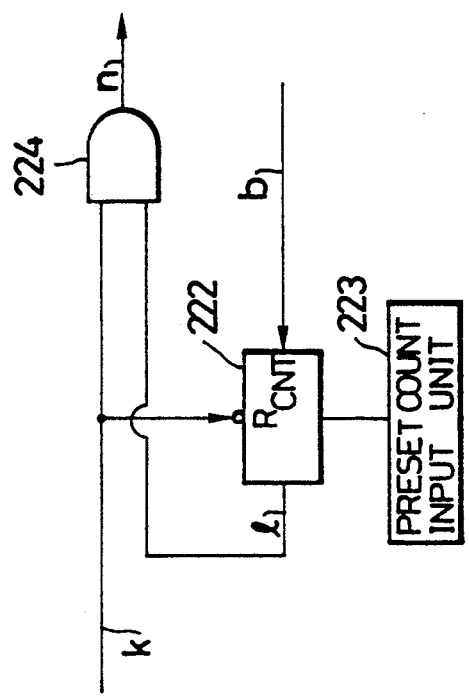
FIG. 26 is a diagram showing a variation of the chattering prevention circuit of FIG. 25(A)

The chattering prevention circuit 218 may also be structured as shown in FIG. 26. In this circuit, a counter 222 is set to an initial count value loaded by means of a preset count input unit 223 and starts counting when the photosensor 155 detects a notch 153 to provide a high level of notch signal k. When the counter 222 counts up a number of divided pulse signals b, equal to the preset initial count value, it outputs a high level (H) signal l to an AND gate 224. In this embodiment, unless the notch signal k is kept at a high level (H) for a time period within which at least the same number of divided pulse signals b as the preset initial count value are counted by the counter 22, the AND gate 224 does not provide a pulse signal D. Accordingly, the chattering prevention circuit 218 thus structured performs the same functions as that shown in FIG. 25(A). Of course, the initial count value set in the count value presetting unit 233 may be selected considering the period on which a dividing pulse signal is to be provided, and the width of the notch signal.

Although the present invention has been described in connection with various preferred embodiments thereof, it will be appreciated that these embodiments are provided solely for purposes of illustration, and should not be construed as limiting the scope of the invention. Other embodiments and applications of the invention will be readily apparent to those skilled in the art from reading the present specification and practicing the techniques described herein, without departing whatsoever from the scope and spirit of the appended claims.

What is claimed is:

1. A bar code printing apparatus for printing with a light emitting element array a latent image of a bar code on a longitudinal side margin of a film continuously transported in a lengthwise direction, said apparatus comprising:

a rotary encoder adapted to be driven by said transported film to output encoder pulse signals in two different phases;

a direction discrimination means for detecting said direction in which said film is transported responsive to said encoder pulse signals, said direction discrimination means including means for outputting a forward direction pulse signal to indicate that a predetermined length of said film is being transported in a forward direction, and means for outputting a reverse direction pulse signal to indicate that said predetermined length of said film is being transported in a reverse direction; and an up-down counter means for counting up either one of said forward direction pulse signal and said reverse direction pulse signal and for counting down a remaining one of said forward direction pulse signal and said reverse direction pulse signal, thereby correctively regulating a transported length of said film in said lengthwise direction;

said direction discrimination means further including:

a clock pulse generating circuit means for generating clock pulse signals at a frequency higher than that at which said encoder pulse signals are output;

a delay circuit means for delaying one of said clock pulse signals to output a delay clock pulse signal;

a first latch circuit means for latching at least one of said encoder pulse signals of two different phases in synchronism with said one of said clock pulse signals to output a transportation signal;

a second latch circuit means for outputting a latch condition signal; and wherein said means for outputting said forward direction pulse signal and said reverse direction pulse signal include two AND gates, each connected to said delay circuit means said first latch circuit means and said second latch circuit means, for outputting said forward direction pulse signal and said reverse direction pulse signal, respectively.

2. A bar code printing apparatus for printing with a light emitting element array a latent image of a bar code on a longitudinal side margin of a film continuously transported in a lengthwise direction, said apparatus comprising:

a rotary encoder adapted to be driven by said transported film to output encoder pulse signals in two different phases;

a direction discrimination means for detecting said direction in which said film is transported responsive to said encoder pulse signals, said direction discrimination means including means for outputting a forward direction pulse signal to indicate that a predetermined length of said film is being transported in a forward direction, and means for outputting a reverse direction pulse signal to indicate that said predetermined length of said film is being transported in a reverse direction; and an up-down counter means for counting up either one of said forward direction pulse signal and said reverse direction pulse signal and for counting down a remaining one of said forward direction pulse signal and said reverse direction pulse signal, thereby correctively regulating a transported length of said film in said lengthwise direction;

said direction discrimination means further including:

a clock pulse generating circuit means for generating clock pulse signals at a frequency higher than that at which said encoder pulse signal is output;

a latch circuit means for latching at least one of said encoder pulse signals of two different phases in synchronism with said one of said clock pulse signals to output two pulse signals; and wherein said means for outputting said forward direction pulse signal and said reverse direction pulse signal include two monostable multivibrators, each triggered by one of said two pulse signals, for outputting said forward direction pulse signal and said reverse direction pulse signal, respectively, at a frequency lower than that at which said one of said clock pulse signals is generated.

3. A bar code printing apparatus for printing with a light emitting element array a latent image of a bar code on a longitudinal side margin of a film continuously transported in a lengthwise direction, said apparatus comprising:

a transportation pulse generating means for generating transportation pulse signals of a number corresponding to a transported length of a film;

a count means for counting a predetermined number of said transportation pulse signals to output a latch signal;

asynchronizing signal generating means for generating a synchronizing signal for a predetermined transported length of said film; and a monitoring means receiving said synchronizing signal from said synchronizing signal generating means for monitoring said transportation pulse signals to determine whether said transportation pulse generating means receives said latch signal from said count means upon generation of said synchronizing signal.

4. A bar code printing apparatus for printing with a light emitting element array a latent image of a bar code on a longitudinal side margin of a film continuously transported in a lengthwise direction, said apparatus comprising:

a rotary encoder adapted to be driven by said transported film to output encoder pulse signals in two different phases;

a direction discrimination means for detecting said direction in which said film is transported responsive to said encoder pulse signals, said direction discrimination means including means for outputting a forward direction pulse signal to indicate that a predetermined length of said film is being transported in a forward direction, and means for outputting a reverse direction pulse signal to indicate that said predetermined length of said film is being transported in a reverse direction;

an up-down counter means for counting up either one of said forward direction pulse signal and said reverse direction pulse signal and for counting down a remaining one of aid forward direction pulse signal and said reverse direction pulse signal, thereby correctively regulating a transported length of said film in said lengthwise direction;

means for printing a latent image of a bar code on said film; and control means for controlling operation of said printing means responsive to output of said up-down counter;

said direction discrimination means further including:

a clock pulse generating circuit means for generating clock pulse signals at a frequency higher than that at which said encoder pulse signals are output;

a delay circuit means for delaying one of said clock pulse signals to output a delayed clock pulse signal;

a first latch circuit means for latching at least one of said encoder pulse signals of two different phases in synchronism with said one of said clock pulse signals to output a transportation signal;

a second latch circuit means for outputting a latch condition signal; and wherein said means for outputting said forward direction pulse signal and said reverse direction pulse signal include two AND gates, each connected to said delay circuit means, said first latch circuit means and said second latch circuit means, for outputting said forward direction pulse signal and said reverse direction pulse signal, respectively.

5. A bar code printing apparatus for printing with a light emitting element array a latent image of a bar code on a longitudinal side margin of a film continuously transported in a lengthwise direction, said apparatus comprising:
- a rotary encoder adapted to be driven by said transported film to output encoder pulse signals in two different phases;
- a direction discrimination means for detecting said direction in which said film is transported responsive to said encoder pulse signals, said direction discrimination means including means for outputting a forward direction pulse signal to indicate that a predetermined length of said film is being transported in a forward direction, and means for outputting a reverse direction pulse signal to indicate that said predetermined length of said film is being transported in a reverse direction;
- an up-down counter means for counting up either one of said forward direction pulse signal and said reverse direction pulse signal and for counting down a remaining one of said forward direction pulse signal and said reverse direction pulse signal; thereby correctively regulating a transported length of said film in said lengthwise direction;
- means for printing a latent image of a bar code on said film; and
- control means for controlling operation of said printing means responsive to output of said up-down counter;

said direction discrimination means further including:
- a clock pulse generating circuit means for generating clock pulse signals at a frequency higher than that at which said encoder pulse signal is output;
- a latch circuit means for latching at least one of said encoder pulse signals of two different phases in synchronism with said one of said clock pulse signals to output transporting condition two pulse signals; and
- wherein said means for outputting said forward direction pulse signal and said reverse direction pulse signal include two monostable multivibrators, each triggered by one of said two pulse signals, for outputting said forward direction pulse signal and said reverse direction pulse signal, respectively, at a frequency lower than that at which said one of said clock pulse signal is generated.

6. A bar code printing apparatus for printing with a light emitting element array a latent image of a bar code on a longitudinal side margin of a film continuously transported in a lengthwise direction, said apparatus comprising:
- a transportation pulse generating means for generating transportation pulse signals of a number corresponding to a transported length of a film;
- a count means for counting a predetermined number of said transportation pulse signals to output a latch signal;
- a synchronizing signal generating means for generating a synchronizing signal for a predetermined transported length of said film;
- a monitoring means receiving said synchronizing signal from said synchronizing signal generating means for monitoring said transportation pulse signals to determine whether said transportation pulse generating means receives said latch signal from said count means upon generation of said synchronizing signal;
- means for printing a latent image of a bar code on a said film; and
- control means for controlling operation of said printing means responsive to output of said monitoring means.

* * * * *